(12) United States Patent
Bethanabhotla et al.

(10) Patent No.: US 10,966,220 B2
(45) Date of Patent: Mar. 30, 2021

(54) METHOD AND APPARATUS FOR SCHEDULING, LOAD BALANCING, AND PILOT-ASSIGNMENTS IN RECIPROCITY-BASED MIMO CELLULAR DEPLOYMENTS

(71) Applicant: NTT DOCOMO, Inc., Tokyo (JP)

(72) Inventors: Dilip Bethanabhotla, Palo Alto, CA (US); Ozgun Bursalioglu Yilmaz, Santa Clara, CA (US); Haralabos Papadopoulos, Los Altos, CA (US); Giuseppe Caire, South Pasadena, CA (US)

(73) Assignee: NTT DOCOMO, INC., Tokyo (JP)

( * ) Notice: Subject to any disclaimer, the term of this patent is extended or adjusted under 35 U.S.C. 154(b) by 15 days.

(21) Appl. No.: 15/032,026

(22) PCT Filed: Dec. 3, 2014

(86) PCT No.: PCT/US2014/068323
§ 371 (c)(1),
(2) Date: Apr. 25, 2016

(87) PCT Pub. No.: WO2015/088854
PCT Pub. Date: Jun. 18, 2015

(65) Prior Publication Data
US 2017/0034841 A1    Feb. 2, 2017

Related U.S. Application Data

(60) Provisional application No. 61/914,319, filed on Dec. 10, 2013.

(51) Int. Cl.
*H04W 72/12* (2009.01)
*H04W 28/08* (2009.01)
(Continued)

(52) U.S. Cl.
CPC ...... *H04W 72/1205* (2013.01); *H04B 7/0413* (2013.01); *H04L 5/0048* (2013.01);
(Continued)

(58) Field of Classification Search
None
See application file for complete search history.

(56) References Cited

U.S. PATENT DOCUMENTS 8,085,875 B2 * 12/2011 Gore .................. H04L 5/005
370/264
2006/0159004 A1    7/2006 Ji
(Continued)

FOREIGN PATENT DOCUMENTS

JP    2009-246717 A    10/2009
WO    20130134720 A1    9/2013

OTHER PUBLICATIONS

Teyab et al., Dynami Relaying in 3GPP LTE-Advanced Networks, Jan. 30, 2009, EURASIP Journal on Wireless Communications and Networking, vol. 2009.*

(Continued)

*Primary Examiner* — Robert M Morlan
*Assistant Examiner* — Rodrick Mak
(74) *Attorney, Agent, or Firm* — Womble Bond Dickinson (US) LLP

(57) ABSTRACT

A method and apparatus is disclosed herein for scheduling, load balancing and/or pilot assignment in MIMD cellular deployments (e.g., reciprority-based MIMO cellular deployments). In one embodiment, the method comprises receiving, by the central controller from at least one AP, for at least one user terminal, a size of a user set and user rate information indicative of a rate that can be provided to the user terminal when served in a group of one or more user terminals; and determining, by the central controller, based
(Continued)

AP 6 divides its users into 5 groups

Abstraction of frequency and time resources for AP-6 on user rate information and the user set size, an allocation of AP resources among the user terminals for the at least one AP.

28 Claims, 9 Drawing Sheets

(51) Int. Cl.
    *H04W 28/16*     (2009.01)
    *H04B 7/0413*     (2017.01)
    *H04L 5/00*     (2006.01)
    *H04W 72/08*     (2009.01)
    *H04W 88/02*     (2009.01)
    *H04W 88/08*     (2009.01)
    *H04W 88/12*     (2009.01)

(52) U.S. Cl.
    CPC .......... *H04W 28/08* (2013.01); *H04W 28/16* (2013.01); *H04W 72/085* (2013.01); *H04W 88/02* (2013.01); *H04W 88/08* (2013.01); *H04W 88/12* (2013.01)

(56) References Cited

U.S. PATENT DOCUMENTS

2009/0257342 A1* 10/2009 Lin ................ H04L 5/0048 370/208
2010/0015914 A1* 1/2010 Li ................ H04B 7/15542 455/7
2012/0134328 A1* 5/2012 Gauvreau ............ H04L 5/0037 370/329
2016/0044665 A1* 2/2016 Novlan ................ H04W 76/14 370/336
2017/0094675 A1* 3/2017 Salem ................ H04W 16/14

OTHER PUBLICATIONS

International Search Report dated Feb. 26, 2015, for PCT Application No. PCT/US2014/068323, 4 pages.
Written Opinion of the International Searching Authority dated Feb. 26, 2015, for PCT Application No. PCT/US2014/068323, 7 pages.
Dianati, Mehrdad, et al., "Cooperative Fair Scheduling for the Downlink of CDMA Cellular Networks", IEEE Transactions on Vehicular Technology, vol. 56, No. 4, Jul. 2007, pp. 1749-1760.
Huh, Hoon, et al., "Achieving 'Massive MIMO' Spectral Efficiency with a Not-so-Large Number of Antennas", IEEE Transactions on Wireless Communications, vol. 11, No. 9, Sep. 2012, pp. 3226-3239.
Caire, Giuseppe, et al., "Multiuser MIMO Downlink with Limited Inter-Cell Cooperation: Approximate Interference Alignment in Time, Frequency, and Space", 46th Annual Allerton Conference on Communication, Control, and Computing, University of Illinois Urbana-Champaign, Monticello, Illinois, Sep. 23-26, 2008, pp. 730-737.
Notification Concerning Transmittal of International Preliminary Report on Patentability issued for International Patent Application No. PCT/US2014/068323, dated Jun. 23, 2016.
Japanese Notice of Reasons for Rejection and English Translation dated Aug. 22, 2018, (11 pages).

* cited by examiner

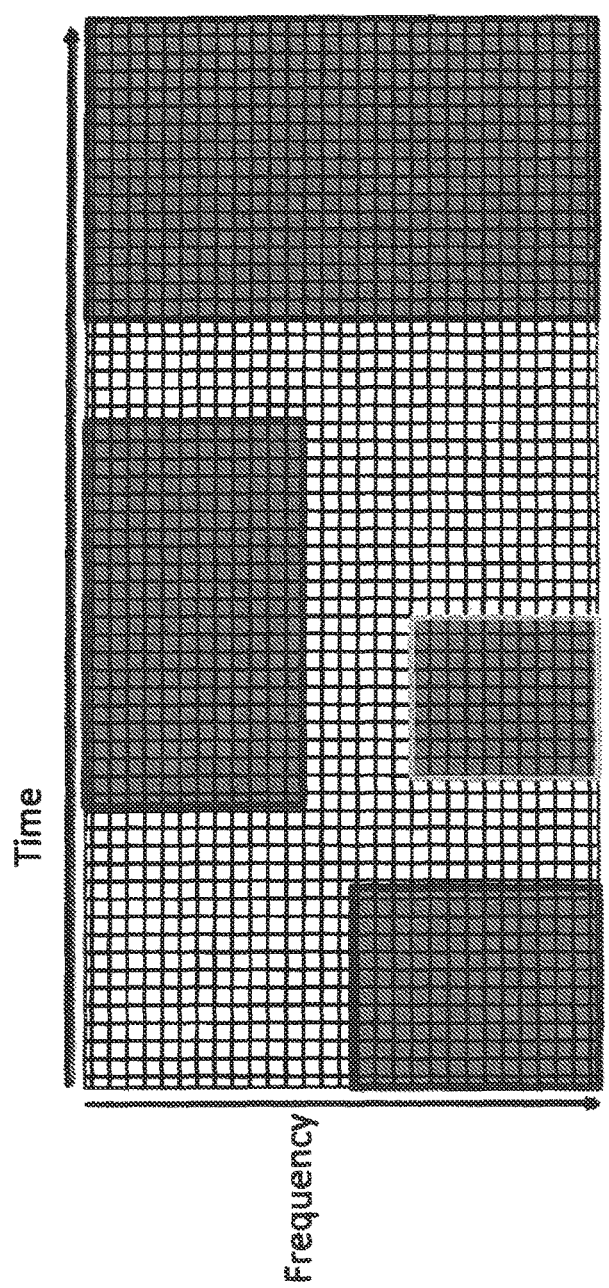
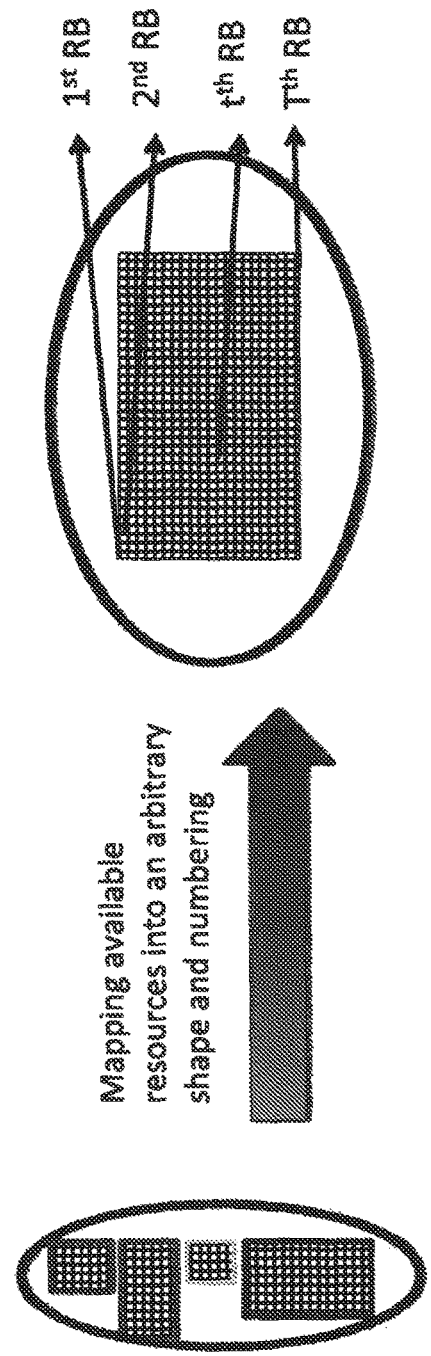
Figure 4

Network Topology: APs on a square grid

METHOD AND APPARATUS FOR SCHEDULING, LOAD BALANCING, AND PILOT-ASSIGNMENTS IN RECIPROCITY-BASED MIMO CELLULAR DEPLOYMENTS

PRIORITY

The present patent application is a U.S. National Phase Application under 35 U.S.C. § 371 of International Application No. PCT/US2014/068323, filed Dec. 3, 2014, entitled METHOD AND APPARATUS FOR SCHEDULING, LOAD BALANCING, AND PILOT-ASSIGNMENTS IN RECIPROCITY-BASED MIMO CELLULAR DEPLOYMENTS, which claims priority to and incorporates by reference the corresponding provisional patent application Ser. No. 61/914,319, titled, "Method and Apparatus for Scheduling, Load Balancing, and Pilot-Assignments in Reciprocity-Based MIMO Cellular Deployments" filed on Dec. 10, 2013.

FIELD OF THE INVENTION

Embodiments of the present invention relate to the field of wireless communications; more particularly, embodiments of the present invention relate to allocating resources for use in wireless communication between user equipments (UEs) and access points (APs) using a centralized controller.

BACKGROUND OF THE INVENTION

Cellular Massive MIMO based on reciprocity-based channel acquisition is becoming a very attractive candidate in consideration of future radio access technologies. This is due to the promise of very large increases in throughput per unit area, especially when used over dense (small cell) deployments. Massive MIMO is also envisioned as a candidate for addressing large variations in user load, including user-traffic hot spots. One aspect that such deployments that must be dealt with effectively in this context is load balancing, that is, associating users with cells not only based on relative signal strength from each cell, but also taking into account the relative user-traffic load in the vicinity of each cell, with goal to optimize network-wide performance. Some heuristic methods for load balancing already exist today. In conventional technologies, user-base station association is decided on the basis of the maximum received beacon signal strength, usually denoted as the Received Signal Strength Indicator (RSSI). In general, such an approach can be arbitrarily suboptimal in heterogeneous network scenarios. "Biasing" is a commonly proposed heuristic method for heterogeneous networks, where the RSSI is artificially scaled by a "bias" term that depends on the base station tier, to inherently steer the user association towards lower-tier base stations and therefore "off-load" the macro-cell and better balance the load across the network tiers. Load balancing plays an even more important role over small cells, as these are inherently less planned, thus less regular than macro deployments, with large variability in effective-area coverage.

Non-uniform load distribution is considered to be a major challenge in small cell networks. If the load cannot be balanced efficiently, the performance gains that are expected as a result of the increased density of network access points (due to use of small cells) may be distributed in a very non-uniform manner within the user population. Various load balancing techniques are proposed for dynamically arranging user load across small cells. These techniques are generally designed considering traditional PHY layer approaches, where one AP serves at most one user at a certain frequency and time resource. But it is well accepted by now that major gains in PHY layer are expected due to MU-MIMO and especially Massive MIMO.

The text that follows provides a brief description of the general area of downlink MU-MIMO, methods for obtaining the required channel state information at the transmitter, methods for network utility optimization, load balancing, and rate calculations for Massive MIMO.

Conventional downlink MU-MIMO schemes have been at the forefront of investigations in the past decade. These schemes allegedly provide spectral efficiency increases by using multiple antennas at the base-station and serving multiple users simultaneously without the need for multiple antennas at the user terminals. This is achieved by using knowledge of the channel state information (CSI) between each user and the transmitting base-station. Having CSIT (CSI available at the transmitter) allows the transmitter to precode the user streams so that each user terminal (UE) sees only its own stream. Given a base station with M transmit antennas, K single-antenna user terminals can be served simultaneously, giving roughly a multiplexing gain equal to $\min(M, K)$ with respect to a system serving a single terminal.

For the transmitter to achieve this operation reliably, it needs to have sufficiently accurate CSIT, i.e., the transmitter needs to know the channels between itself and each of the users with sufficient accuracy. The techniques used for acquiring CSIT fall into two classes. The first class employs M pilots (one per base-station transmit antenna) in the downlink, to allow each user terminal to estimate the channel coefficients between the user-terminal's own antenna(s) and those of the base-station. This operation provides each CSI at each receiving user-terminal (CSIR) regarding the channel between each base-station transmit antenna and the user-terminal receive antennas. The CSIR, i.e., the CSI information available at each user-terminal, is then fed back to the transmitter by use of uplink transmissions to provide CSIT, i.e., CSI at the transmitting base-station. This class of CSIT acquisition schemes has two overheads: (i) a downlink pilot overhead, which scales linearly with M (the number of antenna elements at the transmitting base-station); and (b) an uplink feedback overhead, responsible for making available to the base-station the channels between each user-terminal and each base-station antenna. In the case each user terminal has a single antenna, the uplink feedback is responsible for providing to the base-station the MK channel coefficients (complex-scalar numbers), one coefficient for each channel between each user terminal antenna and each base-station antenna. Although the uplink overhead could in principle be made to grow linearly with $\min(M, K)$, with the methods used in practice this overhead grows as the product of M and K. The downlink overhead limits the size of the antenna array, M, that can be deployed. Similarly the uplink overheads limit both M and K, as the overheads grow very fast with respect to increasing M and K.

The second class of CSIT acquisition techniques is referred to as reciprocity-based training schemes. They exploit a property of the physical wireless channel, known as channel reciprocity, to enable, under certain suitably chosen (M, K) pairs, very high-rate transmission with very efficient CSIT training. In particular, pilots are transmitted in the uplink by each user (K pilots are needed, but more could be used) and the corresponding pilot observations at the base-station are directly used to form the precoder for downlink transmission. If the uplink training and the following downlink data transmission happen close enough in time and frequency (within the coherence time and the coherence bandwidth of the channel), then the uplink training provides the required (downlink channel) CSI at the transmitter directly, since the uplink and the downlink channels at the same time and frequency are the same. In this class of techniques, the uplink overheads scale linearly with K, i.e., with the number of user terminals that will be served simultaneously. These schemes are also typically envisioned as relying on TDD (Time Division Duplex) in order to allow uplink training and downlink transmission within the coherence bandwidth of the user terminal channel with a single transceiver shared for uplink and downlink data transmission.

One attractive aspect of reciprocity-based training schemes is that one can keep on increasing the size of the transmit antenna array, M, making it "Massive", without incurring any increase in the training overheads. Although with M>K, increasing M does not increase the number of simultaneously multiplexed streams, K, (i.e., K streams are simultaneously transmitted, one to each user), increasing M induces significant "beamforming" gains on each stream (which translate to higher rate per stream), at no additional cost in training. Alternatively, increasing M allows reducing the transmit power required to yield a target rate to a user terminal, thereby allowing for greener transmission schemes. Another advantage of Massive MIMO is hardening of the user rates, i.e. with large number of antennas the rate that a user gets does not significantly change by small scale fading.

The challenge with reciprocity based training schemes is that the "compound" uplink and downlink channels at the same time and frequency are not the same. Specifically, although the uplink and downlink physical channel components are the same, each compound channel between a "source node" (responsible for transmitting an information-bearing signal from the transmit antenna) and a destination node (attached to the receive antenna) includes additional impairments due to the transmitter (the circuitry, at the transmitter) and the receiver (the circuitry, at the transmitter). When the transmitter and receiver roles are interchanged, different impairments occur at each node, thereby rendering the two compound channels non-reciprocal. There exist various calibration techniques to calibrate receivers and transmitters so that the compound DL and UL channels are approximately reciprocal. In the following, it is assumed that reciprocity is perfectly established.

Small cell deployment in heavy traffic areas, often referred to as "hot spots," is considered to be a promising solution for coping with surging traffic demands. In some deployment scenarios, the small cell layer might co-exist with the macro cell layer. Another complementary promising direction towards coping with heavy traffic demands in a power- and bandwidth-efficient manner is Massive MIMO. In Massive MIMO, the number of antennas serving users is much larger than number of users being served. In downlink Massive MIMO, for instance, many users can be served at the same time either using Zero Forcing Beamforming, or even the simpler Conjugate Beam Forming, exploiting the fact that the number of users served is far smaller than the number of antennas. As the number of antennas gets large, transmission beams get sharper, enabling achieving desired received signal level with much lower transmitted power levels. Furthermore, with large antenna arrays, the achieved user rates harden, i.e. variance in user rate due to fast (e.g., Rayleigh) fading becomes effectively negligible.

In traditional macro cells deployments, users associate themselves with the macro base station (BS) with the largest power. Although variations can arise in the traffic-load of different nearby BSs, such as e.g., in the case of hot-spots, in general such variations are relatively small due to the size and planning of the cells. In the case of smaller less-planned cells the traffic load from one small cell to the next can exhibit much larger variations. As a result, much larger variability of the load can arise across different small BSs, if users simply associate with the BS from which they receive the strongest signal. Clearly, many BSs may be over-loaded while other nearby BSs might be serving much fewer users. Fortunately, in the case of small cell deployments, many users may be able to receive signals from several BSs as there are more BSs (on average) in proximity. As a result, many recent works consider load balancing and association methods in order to make the best out of the available resources brought by small cells.

The problem of designing good load balancing and user association techniques becomes in general more challenging in cases where more than one user is scheduled at the same time and frequency resources, i.e. with multi-user transmission schemes. Indeed, the rate each user receives in the context of a multiuser transmission scheme, such as e.g., Linear Zero-Forcing Beamforming (LZFBF), depends not only on the user's own channel, but also on the number of other users scheduled together with the user for such multiuser transmission as well as the channels of these users. The problem of scheduling user sets to maximize the sum of user rate when LZFBF precoding is applied has been considered, and a greedy algorithm has been proposed for the user selection when considering a single cell with a single BS.

Clearly providing a practical method that can achieve balancing the load across BSs and attains the desired benefits from MU-MIMO transmission and scheduling is in general non-trivial.

Reciprocity-Based Massive MU-MIMO

Consider the problem of enabling MU-MIMO transmission from an array of M transmit antennas to s single-antenna user terminals. The downlink (DL) channel between the i-th base-station transmitting antenna and the k-th user terminal is given by $$\vec{y}_{ki} = \vec{h}_{ki}\vec{x}_i + \vec{z}_{ki}$$

where $\vec{x}_i$, $\vec{h}_{ki}$, $\vec{y}_{ki}$, and $\vec{z}_{ki}$ denote the transmitted signal from base-station antenna i, the compound DL channel between the two antennas, the observation and noise at the receiver of user terminal k, respectively. This model is applicable at any frequency and time resource. In general, the variables in the above equation are frequency and time dependent. This dependency is currently ignored in the notation for convenience though with an abuse of notation, it will be used when time-sharing across various resource blocks are considered. The amplitude and phase shifts introduced by RF-to-baseband conversion hardware (e.g., gain control, filters, mixers, A/D, etc.) at the receiver of user terminal k as well as the amplitude and phase shifts introduced by the baseband-to-RF conversion hardware (e.g., amplifiers filters, mixers, A/D, etc.) at the transmitter generating the signal to be transmitted by base-station antenna i are all included in the DL compound channel.

Similarly the uplink channel between the k-th user terminal and the i-th base-station antenna is given by $$\overline{y}_{ik} = \overline{h}_{ik}\overline{x}_k + \overline{z}_{ik}$$

where $\overleftarrow{x_k}$, $\overline{h_{ik}}$, $\overline{y_{ik}}$, and $\overline{z_{ik}}$ denote the transmitted signal from user terminal k, the compound uplink (UL) channel between the two antennas, and the observation and noise at the receiver of base-station antenna i, respectively. The amplitude and phase shifts introduced by RF-to-baseband conversion hardware (e.g., gain control, filters, mixers, A/D, etc.) at the receiver of base-station antenna i as well as the scalar (complex) coefficient $\overline{t_k}$ contains the amplitude and phase shifts introduced by the baseband-to-RF conversion hardware (amplifiers filters, mixers, A/D, etc.) at the transmitter generating the signal to be transmitted by user terminal k are all included in the compound UL channel.

In the uplink, the following model exists:

$$\overline{\mathbf{y}} = \overline{\mathbf{H}}\,\overline{\mathbf{x}} + \overline{\mathbf{z}}$$

where $\overline{\mathbf{x}}$ is the vector of dimension s×1 (i.e., s rows by 1 column) comprising the user symbols on subcarrier n at symbol time t, $\overline{\mathbf{H}}$ is the M×s channel matrix that includes the constant carrier phase shifts and the frequency-dependent constant in time phase shifts due to the relative delays between the timing references of the different terminals, $\overline{\mathbf{y}}$ and $\overline{\mathbf{z}}$ are the received signal vector and noise at the user terminal.

In the Downlink, the following model exists:

$$\vec{y} = \vec{x}\vec{H} + \vec{z}$$

where $\vec{x}$ is the (row) vector of user symbols on subcarrier n at symbol time t, $\vec{H}$ is the s×M channel matrix that includes the constant carrier phase shifts and the frequency-dependent constant in time phase shifts due to the relative delays between the timing references of the different terminals, $\vec{y}$ and $\vec{z}$ are the received signal (row) vector and noise at the user terminals. Other APs at sufficiently close distance cause interference as Network MIMO/joint transmission/CoMP or any other interference mitigation techniques are not considered. Interference from the other access points is included in the noise term.

Assuming perfect calibration, the compound UL and DL channels become reciprocal and then $$\overline{\mathbf{H}} = \vec{H}$$

For simplicity, the thermal noise is neglected. In order to estimate the downlink channel matrix, the s user terminals send a block of s OFDM symbols, such that the uplink-training phase can be written as $$\overline{\mathbf{Y}}_{tr} = \overline{\mathbf{H}}\,\overline{\mathbf{X}}_{tr} + \text{noise}$$

where $\overline{\mathbf{X}}_{tr}$ is a scaled unitary matrix. Hence, the base-station can obtain the channel matrix estimate $$\overline{\mathbf{Y}}_{tr}\overline{\mathbf{X}}_{tr} = \overline{\mathbf{H}} + \text{noise}$$

In order to perform downlink beamforming, the compound channel downlink matrix $\vec{H}$ is used.

The ZFBF precoding matrix can be calculated as $$W = \Lambda^{1/2}[\vec{H}^H\vec{H}]^{-1}\vec{H}^H$$

where $\Lambda$ is a diagonal matrix with $\lambda_m$'s as diagonal elements that imposes on each row of the matrix W, the row normalization $\|w_m\|^2 = 1$, for all m.

Hence, the ZFBF precoded signal in the downlink with equal power for each beam also taking account a distance-dependent pathloss model with the diagonal matrix matrix G, whose diagonal elements are $g_i$'s.

$$\vec{y} = \vec{u}p^{1/2}G^{1/2}W\vec{H} + \vec{z}$$
$$= \vec{u}p^{1/2}G^{1/2}\Lambda^{1/2}\left[\vec{H}^H\vec{H}\right]^{-1}\vec{H}^H\vec{H} + \vec{z}$$
$$= \vec{u}p^{1/2}G^{1/2}\Lambda^{1/2} + \vec{z}$$

$$\lambda_k = \frac{1}{\left[\left(\vec{H}^H\vec{H}\right)^{-1}\right]_{k,k}}$$

Notice that the resulting channel matrix is diagonal, provided that s≤M.

Background on MU-MIMO User Scheduling

Although there several methods available in the literature, for scheduling multi-user MIMO transmissions at the BS, a widely accepted class of methods involves scheduling policies which, at any given scheduling instant at the BS, schedule the subset of users that would yield the highest expected weighted sum-rate. Each user's expected rate in each scheduled set for transmission is a function on the instantaneous channels of all the users in the scheduled set. Indeed, assuming LZFB transmission as described in the preceding section, at any given resource block the coefficients $\lambda_k$'s depend on the instantaneous channel matrix of all users in the scheduling set (served by ZFBF), and in particular, they can be expressed as $$\lambda_{k,S}(t) = \frac{1}{\left[\left(\vec{H}_{k,S}^H(t)\vec{H}_{k,S}(t)\right)^{-1}\right]_{k,k}}, \quad (1)$$

where $\vec{H}_{k,S}(t)$ denote the compound downlink channel matrix for $UE_k$ in the user set S at the $t^{th}$ resource block. Clearly, since the choice of the user set S and/or resource block (t) affects $\lambda_k$, the expected user rates are a function of both the scheduling set and the instantaneous channel realization. Fixing the scheduling time instance, and assuming LZFBF transmission, the problem of choosing the subset S that maximize the weighted sum-rate is combinatoric in the number of antennas, as the number of possible subsets, S, that can be considered for scheduling grows exponentially fast with the maximum number of users that can be considered for joint scheduling. One solution to this problem relies on a greedy algorithm for user set selection, with at most quadratic complexity.

Another important factor defining the scheduling assignments that are produced by the scheduling policy is the method by which the "user weights" are chosen at each scheduling instant, prior to performing the weighted sum rate maximization operation. Although many methods exist for choosing these weights, a widely accepted class of methods (because of their ability to result in nearly optimal performance with respect to a fairness criterion belonging to a broad class of fairness criteria) is one that relies on the use of "virtual queues" to determine the instantaneous user-weights in the weight-sum rate optimization.

Load Balancing

Traditionally, association in cellular networks has been user-terminal based. Users measure their signal-level with respect to the beacons of the nearby BSs and associate to the base-station with the strongest received signal. A generalization of this principle has been used in heterogeneous networks. In the case of comparing signal strengths from a macro and a small cell, a user-terminal can also apply a "bias" to favor association to the small cell (with respect to the macro cell).

As traffic-load imbalances are far more pronounced in small cells, there has been some recent work in load balancing in small cells. Indeed, small cells are much more sensitive to the cell association policy because of the non-uniformity of cell size, and the smallest average number of users they serve. This non-uniformity can result in extremely imbalanced traffic-load based on a max-SINR cell association. There are methods of exchanging information between each user and close-by BSs, which attempt to balance their load using signaling exchanges with nearby users. Another related technique, referred to as "cell breathing", relies on dynamically changing (contracting or expanding) the coverage area depending on the load situation (over-loaded or under-loaded) of the cells by adjusting the cell transmit power. Note that these techniques focus on small cells scheduling only single-user transmissions.

The methods described above have important limitations. First, given that the user rates in a MU-MIMO transmission are not simply a function of large-scale signal-to-interference plus noise ratio (SINR), but in general depend on the scheduling set and the channel realization, the resulting load-balancing techniques are not extendable in any straightforward resource-efficient manner. Furthermore, the nature of reciprocity-based Massive MIMO TDD makes large scale SINR in a link between a user and all BSs in proximity available given a single uplink pilot broadcast from the user.

SUMMARY OF THE INVENTION

A method and apparatus is disclosed herein for scheduling, load balancing and/or pilot assignment in MIMO cellular deployments (e.g., reciprority-based MIMO cellular deployments). In one embodiment, the method comprises receiving, by the central controller from at least one AP, for at least one user terminal, a size of a user set and user rate information indicative of a rate that can be provided to the user terminal when served in a group of one or more user terminals; and determining, by the central controller, based on user rate information and the user set size, an allocation of AP resources among the user terminals for the at least one AP.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 illustrates a mapping of available frequency and time resources to a group of T resource blocks.

DETAILED DESCRIPTION OF THE PRESENT INVENTION

Figure 1:
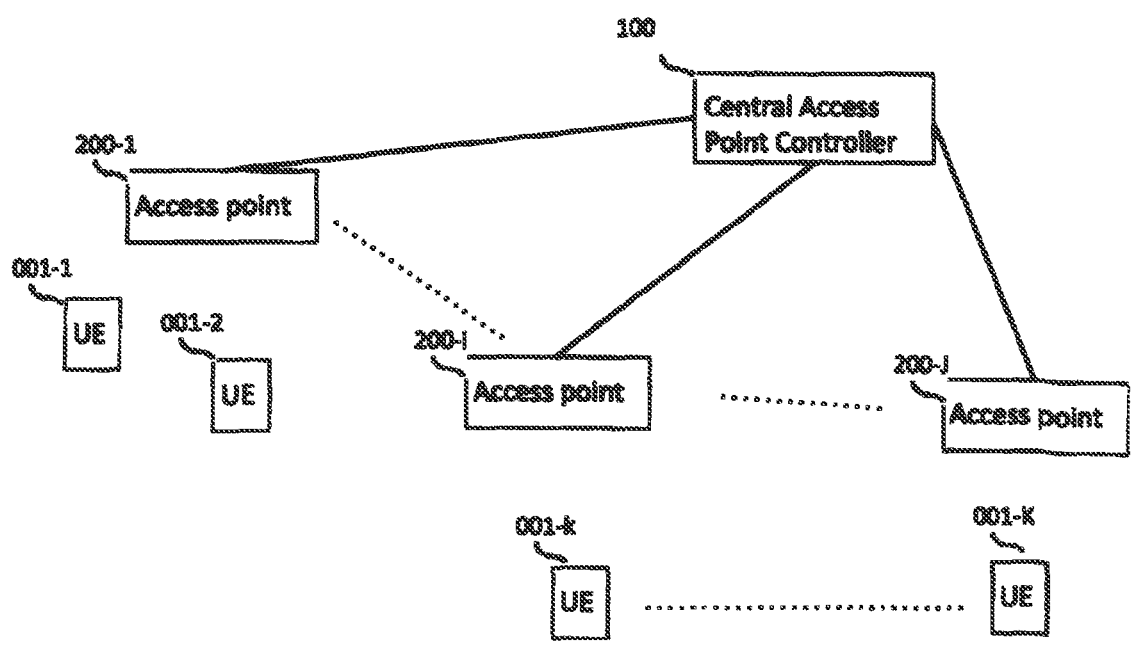
FIG. 1 is a block diagram of one embodiment of a wireless network.

Embodiments of the invention include techniques for load balancing and scheduling using a combination of processing and information shared between a central controller and a set of APs.

Embodiments of the invention include methods and apparatuses that allow scheduling, load balancing, and pilot-assignments in reciprocity-based single-user and multiuser MIMO cellular deployments, including such deployment with large antenna arrays and a large number of users. The disclosed scheduling, load balancing and pilot-assignments techniques can be used for providing efficient operation for a variety of wireless networks, including, but not limited to, macro cells, small cells, heterogeneous network deployments.

Embodiments of the invention consider the joint use of access points (APs) and a central controller (e.g., processor) coupled to these APs for performing load balancing and scheduling over the area served by the APs. Embodiments of the invention leverage an efficient decoupling of the problems of load balancing and scheduling, according to which, the central controller performs (periodically) resource allocations among users and APs, while user scheduling is performed at the finer time-scale by the APs based on the information shared by the central controller, but otherwise independently from one another. In one embodiment, the central controller performs the load balancing based on a network-wide criterion using individual long-term user rates. In one embodiment, user rates are selected, and potentially optimized, with respect to a network wide objective, which is independent of the instantaneous scheduling sets.

Embodiments of the invention tie the long-term rate received by each user to the activity fractions of the user on each AP (e.g., the fraction of resources of the AP allocated to serving multi-user sets that include the user). In one embodiment, these activity fractions are also a function of the size of the user-set being scheduled. Upon obtaining these activity fractions from the central controller (which computes them), an AP uses them to perform scheduling of the individual users over a (possibly very large) number of resource blocks, while complying with the provided user-activity fractions, but at the coarser time scale (over which these are updated).

In one embodiment, load balancing performed at the central controller relies on only large-scale fading characteristics, which do not change rapidly and for each UE are dictated by the large-scale signal strength between the UE and each AP in its proximity. Note that, once the activity fractions are obtained and sent to the APs, in one embodiment, user scheduling is performed while taking into account of one or more of pilot overheads, control information dissemination overheads, user-specific application constraints, user terminal battery considerations, etc.

Embodiments of the invention include forward methods for performing load balancing subject to a fairness criterion (from a broad class of fairness criteria) in a resource-efficient way. Embodiments of the invention also enable scheduling assignments which, subject to a given set of activity fractions provided by the central controller, allow very low control signaling overhead, and/or enable different trade-offs in control signaling, and different user-specific application constraints.

Embodiments of the invention enable network operation for reciprocity-based MU-MIMO over TDD deployments, such as e.g., in the 3.5 GHz or beyond, with large antenna arrays and large numbers of users. It allows load balancing across many small cells and can enable thus high multiplexing gains for all users across the network in a fair fashion, while allowing APs to still flexibly schedule transmissions (based on the load-balancing resource allocations), e.g., tailored to application or user-based criteria.

Note that the terms APs and base stations (BSs) are used throughout. The techniques described herein may be used in wireless communication networks that include APs and those that include BSs, and thus for purposes of at least the claims, they may be used interchangeably. Also, the terms "user," "user terminal," and "user equipment" are used interchangeably.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions, that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Wireless Communication Network Overview

Embodiments of the invention include load-balancing and scheduling methods and pilot designs that can efficiently operate a wireless communication network using large-scale propagation characteristics (or large scale fading) of the wireless channel. In one embodiment, the wireless communication network is a network of Massive MIMO cells. Embodiments of the invention allow the separation of load balancing and user scheduling for the multi-user transmission. A central controller unit selects the load across APs. In one embodiment, the central controller selects the load by determining the fractions of resources given for each AP-UE pair while APs choose their own schedules and pilot design for users according to the fraction of resources they get for each user as well as user and/or application constraints.

FIG. 1 is a block diagram of one embodiment of a wireless communication network with J APs and K user equipment (UEs), where a central AP controller unit 100 controls the APs in the network. Referring to FIG. 1, the communication system includes AP $200_1$-$200_J$, along with UEs $001_1$, $001_2$ and $001_k$-$001_K$. Note that any number of APs and UEs might be in the system.

Each AP sends information to central AP controller unit 100 regarding the user-rate information indicative of a rate that can be provided to the user during the resource elements where the user is scheduled and served in a group of one or more users by that AP. In one embodiment, this information is based on large scale fading channel conditions between the AP and the UE. Central AP controller unit 100 determines an allocation of AP resources among the UEs based on user rate information that can be provided to each UE by each AP (in a subset of APs in the vicinity of the UE) that can serve the UE, as well as the size of the user set that is served by each AP. In one embodiment, this allocation aims at optimizing a network-wide performance metric. In one embodiment, the performance metric is captured by a network-wide utility function, which is a real-valued function, mapping any given set of average long-term UE rates that are provided (over time) by the network (i.e., by the totality of the APs in the network) into a single metric/value. This function is referred to herein as a network-wide utility metric and in one embodiment, is chosen by the network operator. In one embodiment, the long-term user-rate that is provided to a user by the network over a set of transmission resources is computed by the central controller based on the above user-rate information provided to it by each AP that can potentially serve the user and the allocation of AP resources decided by the controller. In one embodiment, the AP resources, include time and frequency resources: i.e. groups of resource elements corresponding to different frequency tones and symbol times in an OFDM plane. Note that additional information, such as, e.g., delay constraints, may also be taken into account in performing the AP-UE resource allocation. This information is sent to the APs $200_1 \ldots 200_J$.

In one embodiment, central AP controller 100 applies a network-wide utility function, which maps a set of long-term user rates provided by the network (based on resources allocated by the network APs to the users) into a single value. The utility function is chosen by the network operator. Its goal is to capture a notion of fairness in allocating resources across the UE population and provides a convenient tool that allows the central controller to effectively allocate resources from the APs to the UEs by aiming to do this allocation in such a way as to maximize the utility metric, i.e., the value of the network-wide utility function.

In one embodiment, the central controller makes its determination based on "locally" averaged user-rates, that is, the user rates are averaged over the time period over which the given load-balancing solution is to applied. These are the rates that the controller predicts and/or expects to be able to provide to the users during the period (i.e. the set of time-frequency resource elements) that these activity fractions would be used at each AP to assign scheduling resources. In one embodiment, the controller performs this load-balancing operation every so often (e.g., every few seconds to minutes). Over time, users move (so their large-scale channel coefficients change), new users enter the network, and some users leave the network, so the peak rates and the activity fraction allocations are periodically re-updated. In one embodiment, the resource allocation information sent by central controller unit 100 to one of APs $200_1 \ldots 200_J$ includes activity fractions, e.g., the fractions of resources a user is served by this AP. In one embodiment, the activity fraction between a user and an AP is a number between 0 (corresponding to the AP not serving this user at all within the time interval over which the load balancing allocation is to be applied), and 1 (corresponding to the AP serving this user in every available transmission resource block over the time interval that the load balancing allocation is to be applied). In one embodiment, there a single activity fraction for each UE-AP pair that is applied across all of the resource blocks over which the load balancing solution is to be applied. In one embodiment, an AP's transmission resources may be split in sets of resource blocks, whereby distinct scheduling user-set sizes are served in each set of resource blocks. In this case the activity fractions provided by the controller may depend on the scheduling set size. In one embodiment, conventional or fractional frequency reuse may be employed. In that case, the transmission resources may be split in sets of resource blocks, whereby a distinct power mask (i.e., a distinct set of AP transmission powers across the network) is used in each set (this set of power masks captures the frequency reuse method employed). In that case, the activity fractions provided by the controller may also be power-mask dependent. Note, however, that activity fractions do not necessarily specify the scheduling sets. Given these fractions, various scheduling sets can be chosen by APs in its scheduler (e.g., scheduler 216 of FIG. 2).

According to the activity fractions as well as the other constraints (e.g., user and/or application constraints), APs $200_1 \ldots 200_J$ schedule UEs independently. Due to independent scheduling, two APs might schedule the same UE at the same frequency and time resource. From a UE's point of view, this is a contention of AP signals. From an AP's point of view, this is an overlap of the user sets scheduled at different APs for the same resource block. In one embodiment, APs exchange information to avoid overlaps. In one embodiment, information provided by central AP controller 100 includes information to avoid overlaps. In one embodiment, for each user that has been allocated non-zero activity fractions from multiple APs, central AP controller 100 may also provides to these APs information indicative of constraints in the allocation of their scheduling resources, so as to ensure that the user is not scheduled for transmission on the same resource block by multiple APs.

Figure 2:
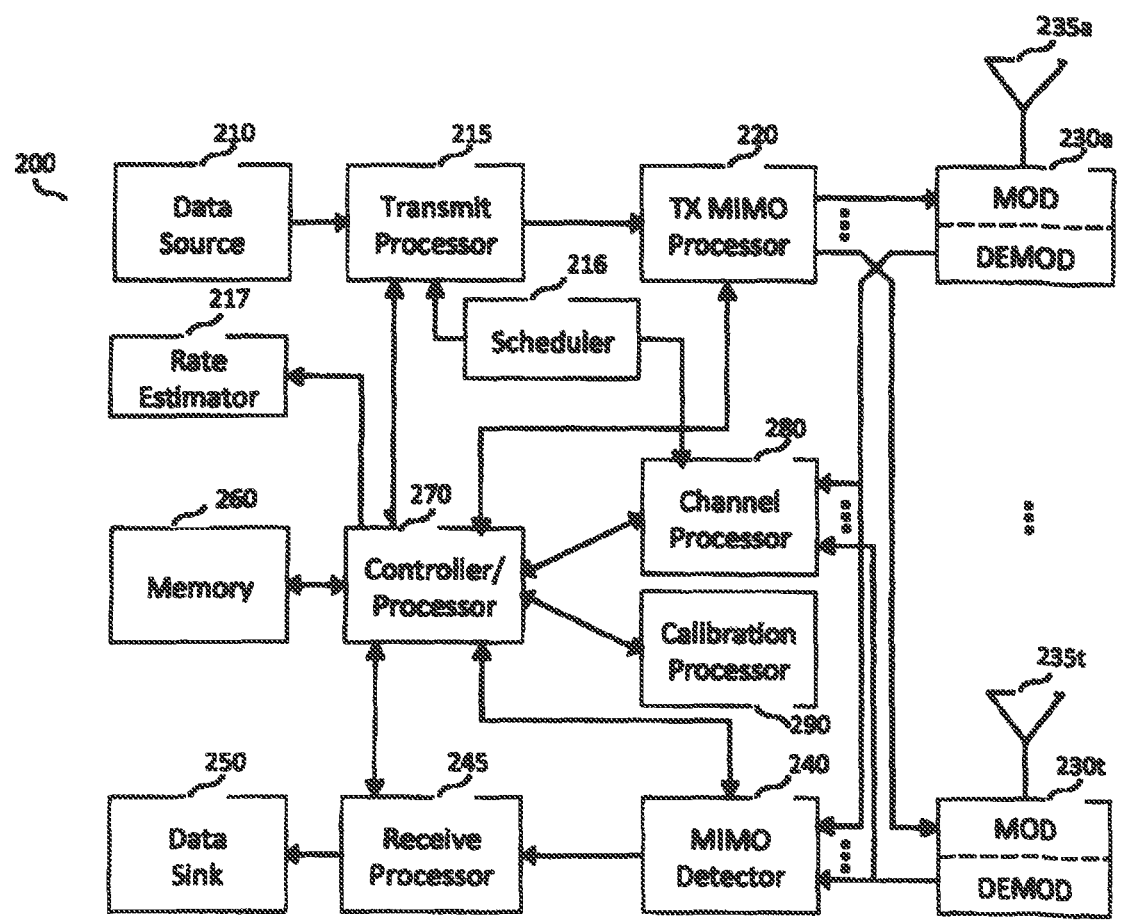
FIG. 2 is a block diagram of one embodiment of an access point that includes a scheduler unit and a rate estimator unit.

FIG. 2 is a block diagram of one embodiment of an AP. Referring to FIG. 2, AP 200 includes standard modules for MIMO wireless transmission. A transmit processor 215 at AP 200 receives data for one or more UEs from a data source 210, processes the data for each UE and provides data symbols to all UEs. Processor 215 also receives and processes control information from a controller/processor 270 and provide control symbols. Processor 270 also generates reference symbols for one or more reference signals. A transmit (TX) MIMO processor 220 performs precoding on the data symbols, the control symbols, and/or the reference symbols for each UE as well as for reference signals for antennas co-located at the same AP 200 or to other wireless entities such as, for example, other APs, RRH's, etc.

Processor 220 provides parallel output symbols streams to modulators, MODS (230a through 230t). Each of MODs 230a-230t further processes (e.g., convert to analog, amplify, filter, and upconvert) the output sample stream to obtain a downlink signal. The downlink signals from modulators 230a through 230t are transmitted via antennas 235a through 235t, respectively.

At AP 200, the uplink signals from various UE's or by other antennas, collocated at the same AP 200 or located at different APs or other wireless entities are received by antennas 235a through 235t, demodulated by demodulators (DEMODs 230a-230t). The demodulated signals are detected by MIMO detector 240 and further processed by a receive processor 245 to obtain decoded data and control information sent by UE's and other wireless entities. Receive processor 245 receives detected signals from MIMO detector and provides decoded data to a data sink 250 and control information to controller/processor 270. The demodulated signals output by DEMODs 230a through 230t are also provided to channel processor 280 where the uplink channel is estimated and provided to controller/processor 270.

AP 200 also includes a calibration processer unit 290. In one embodiment, calibration processor 290 exchanges control information with controller/processor unit 270. Calibration processor 290 calculates calibration values, which is used at controller/processor 270 together with UL channel estimation to construct downlink channel estimation. The downlink channel estimation is provided to TX MIMO processor 220 for precoding. In one embodiment, processing at calibration processor 290 involves both the signaling and data collection aspects of calibration as well as the relative calibration methods, which are based on the collected data, and, possibly additional parameters, including past relative calibration values for arbitrary subsets of the transmit antenna nodes at this and possibly other APs.

In one embodiment, AP 200 also includes a rate estimator unit 217. Rate estimator unit 217 obtains information regarding the state of the propagation channel between the AP and users from controller/processor 270. Rate estimator unit 217 in each AP calculates an indicator of the rate a user can get if it served the user. In one embodiment, this rate indicator depends on large-scale fading characteristics of the wireless channel between the AP and the user, a scheduling set size, and a power mask. Rate estimator unit 217 sends this information to central AP controller 100 of FIG. 1.

In one embodiment, AP 200 also includes a scheduling unit, scheduler 216. Scheduler 216 exchanges scheduling information with transmit processor unit 215. According to this information, transmit processor 215 requests the data of the scheduled users from data source 210. Scheduler 216 also provides the information specifying uplink channel estimates for specific users to channel processor 280. Scheduler 216 processes the information provided by central AP controller 100. In one embodiment, the information provided by central AP controller 100 includes activity fractions. In one embodiment, the information also includes various scheduling constraints. In one embodiment, scheduler 216 communicates with the schedulers of other APs in order to enable feasible, non-overlapping transmissions at each user terminal.

Central AP controller unit 100, scheduler 216, and rate estimator unit 217 operate together to facilitate embodiments of the invention and in one embodiment involve both the load balancing, scheduling and pilot design aspects of massive MIMO operation.

Figure 3:
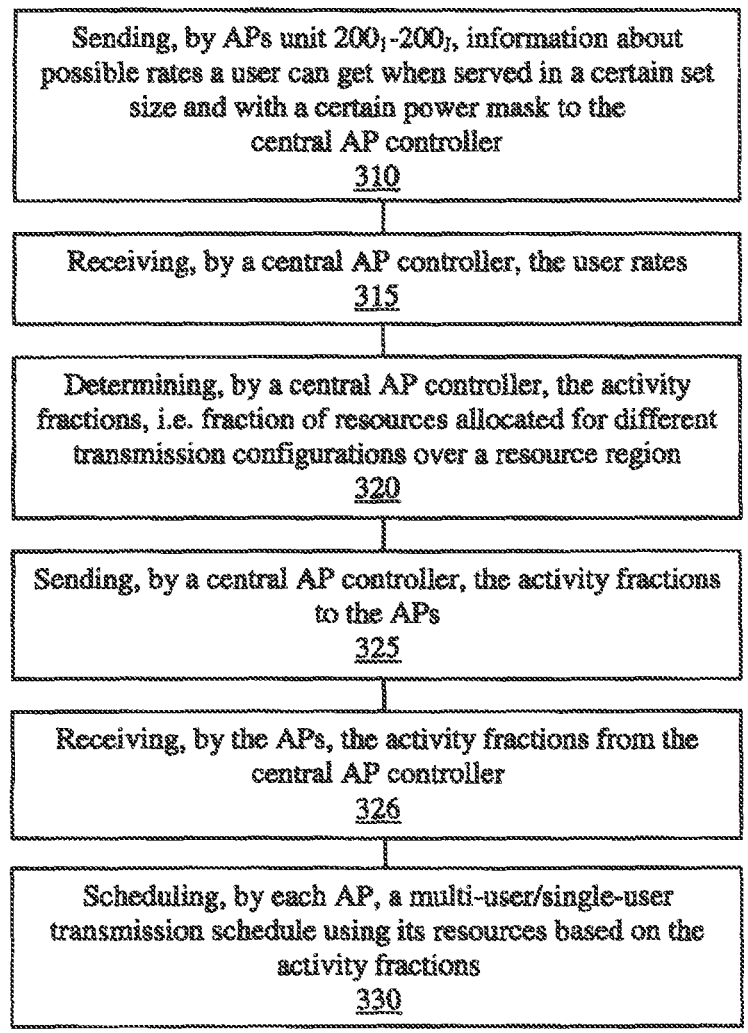
FIG. 3 is a flow diagram of one embodiment of a load balancing and scheduling process.

FIG. 3 is a flow diagram of one embodiment of a process for load balancing and scheduling. The process is performed by processing logic that may comprise hardware (circuitry, dedicated logic, etc.), software (such as is run on a general purpose computer system or a dedicated machine), firmware or a combination of the three.

Referring to FIG. 3, processing logic in AP units such as, for example, APs unit $200_1$-$200_J$, sends information about possible rates a user can get when served in a certain set size and with a certain power mask to the central AP controller (e.g., controller 100) (processing block 310). Processing logic in the central AP controller receives the user rates (processing block 315). The central AP controller determines the activity fractions, i.e. fraction of resources allocated for different transmission configurations over a resource region (processing block 320). In one embodiment, these configurations include different AP-client pairs, different set size for multi-user transmission and different power masks. Note that in the alternative embodiments, fractions of resources allocated from only a subset of these different transmission configurations are determined.

Next, the central AP controller sends the activity fractions to the APs (processing block 325), which receives them (processing block 326). These activity fractions are used by each AP to set up its multi-user/single-user transmission schedule using its resources (processing block 330).

Multi-User Scheduling and Load Balancing

Assume a geographical area is served by a group of J APs, which are controlled by the same central AP controller. The APs schedule sets of users for multi-user or single-user transmissions. Users can be scheduled by different APs in many different ways. Scheduling at each AP can also vary across frequency and time resources as user sets assigned to different APs change. In general, a user may not necessarily be scheduled by an AP at every resource block. In a cellular single-user or multi-user transmission (i.e., coordinated multipont transmission involving and joint precoding among APs is not considered). As a result, the user sets that are scheduled in each resource block by different APs are disjoint.

Let A denote the set of all users that are to be served by the group of APs. Let the total number of users in the set be equal to $|A|=K$. Any user subset collection $\underline{S}=\{S_1, S_2, \ldots, S_J\}$ satisfying the conditions below constitutes a feasible scheduling instant for the network, where $S_i$ denotes the scheduling set for AP-i:

1) $|S_i| \leq \min\{M, K\}$ for all i,
2) $S_i \cap S_j = \emptyset$ for $i \neq j$,
3) $S_i \subseteq A$ for all i.

Assume that the subset collection $\underline{S}=\{S_1, S_2, \ldots, S_J\}$ satisfies the above rules and at the t-th resource block each $AP_i$ in the network schedules a multiuser transmission with the users in $S_i$ with sum power constraint $P_i$. As an example consider Linear Zero Forcing Beam Forming precoding, a $UE_k$ in $S_i$ gets the following rate from $AP_i$ at t-th resource block:

$$R_{k,i}(S_i, t) = \log_2\left(1 + \frac{g_{ik}\lambda_{k,S_i}(t)\frac{P_i}{|S_i|}}{1 + \sum_{j \in J} g_{jk}P_j}\right), \text{ where } \lambda_{k,S_i} \text{ is given by (1)}$$

Obviously if $k \notin S_i$, then $R_{k,i}(S_i, t)=0$.

The sum throughput for the t-th resource block for all users for a given feasible scheduling instant $\underline{S}=\{S_1, S_2, \ldots, S_J\}$ is as follows:

$$R_{sum}(\underline{S}, t) = \sum_{i=1}^{J} \sum_{k \in S_i} R_{k,i}(S_i, t)$$

Next the frequency and time resources in an OFDM plane are considered. One problem is the selection of users to schedule at each resource block in order to satisfy some fairness among users as well as efficiency. To this end, a subset of frequency and time resources where large-scale fading coefficients do not vary significantly in time and frequency is considered. These resources are abstracted by a set of T resource blocks. FIG. 4 illustrates these resource blocks, which are not necessarily adjacent to each other, are enumerated from 1 to T.

There are various feasible scheduling instants. Using a variety of feasible scheduling instants over many resource blocks, time-sharing (TDMA) across feasible scheduling instants is obtained. Then TDMA across all of the feasible scheduling instants determines the average rate for each user denoted by $R_k$. Let $S_i^{(t)}$ denote the scheduling set for $AP_i$ at the t-th resource block. The scheduling instant for this network at resource block t is denoted by the user subsets $\underline{S}(t)=\{S_1(t), S_2(t), \ldots, S_J(t)\}$.

A combination of scheduling instants for $t=1, \ldots, T$, denoted by $\underline{\underline{S}}=\{\underline{S}(1), \underline{S}(2), \ldots, \underline{S}(T)\}$ makes one scheduling for the network over T resource blocks. Let $\underline{S}_i=\{S_i(1), $S_i(2), \ldots, S_i(T)\}$ denote the individual schedule for $AP_i$. Similarly $\underline{S}=\{\underline{S}(1), \underline{S}(2), \ldots, \underline{S}(T)\}$ is the schedule for all of the APs in the network.

Then the total rate for $UE_k$ over T resource blocks for this scheduling is calculated as follows:

$$R_k = \sum_{t=1}^{T} \sum_{i \in J} R_{k,i}(S_i(t), t)$$

System performance of the downlink can be improved, and potentially optimized, to satisfy some type of fairness among user rates as well as efficient network operation. A generic Network Utility Maximization (NUM) max U ($R_1$, $R_2, \ldots, R_K$) can be used for various fairness criteria. The scheduling for users can be chosen to maximize the utility function. As an example, maximizing $$U(R_1, R_2, \ldots, R_K) = \sum_k \log(R_k)$$

enforces Proportional Fairness among users. In another example, the network can be operated according to the worst-case performance by using max-mm fairness with U ($R_1, R_2, \ldots, R_K$)=$\min_k R_k$.

Another common utility function is the weighted sum rate:

$$U(R_1, R_2, \ldots, R_K) = \sum_{k=1}^{K} w_k R_k.$$

It is well known that by setting $w_k=(R^*_k)^{-1}$, where $R^*_k$ is the optimal throughput for the $k^{th}$ UE, the proportional fairness can be achieved. But, in general $R^*_k$'s cannot be known ahead of time. By running weighted sum rate optimization at each resource block for many blocks where user weights are updated iteratively, PFS can be approximated [well-known in the art]. In one embodiment, PFS approximation is performed as described inP.Viswanath et al., "Opportunistic beamforming using dump antennas," IEEE Trans. Inf. Theory, vol. 48, no. 6, pp. 1277-1294, June 2002 and G. Caire et al., "Multiuser MIMO Downlink with Limited Inter-Cell Cooperation: Approximate Interference Alignment in Time, Frequency and Space," Forty-Sixth Annual Allerton Conference Allerton House, URIC, Illinois, USA September 23-26, 2008.

If the user rates for every feasible scheduling instant can be calculated for every resource block ahead of time, one can calculate average user rates, and hence the utility, for every scheduling. This is a very difficult task because: 1) there are so many feasible scheduling instants and 2) average rate calculation is done over a large number of resource blocks. Besides the enormous difficulty, this is also not practical, as CSI information for some of the resource blocks might not be known at sufficiently high quality at the time of scheduling.

In one embodiment, this network utility optimization is considered in the case of Massive MIMO. Due to hardening of user rates, in one embodiment, NUM is performed without necessarily calculating user rates for every feasible scheduling instant at every resource block. At least some load balancing and scheduling algorithms described herein depend on large-scale fading information. In one embodiment, the rate of a scheduled user herein is independent of small-scale fading, and hence is independent of the resource block for which it is scheduled. The rate a user gets from an AP depends on the size of the scheduling set rather than the other users with which that user is scheduled. These properties allow the separation of the task of load balancing, i.e. optimizing average user rates according to a NUM and scheduling into two different problems. In case of Massive MIMO, the average user rates can be written in terms of user's activity fractions (i.e. the fraction of time a user is scheduled with an AP in a specific set size). Hence NUM optimization can be done by optimizing user's activity fractions at the central AP controller.

Note that in one embodiment, the communication system only includes a central controller and a single AP. As a result, in one embodiment, in this case each user in the network has already been associated with an AP by some mechanism and can be viewed as instance of a network of APs whereby the central controller for each AP independently determines the set of user-AP activity fractions and shares it with its AP for schedulingThe problem formulation covers, as a special case, the scenarios where at any resource each AP serves only a single user by confining all scheduling sets to be single element sets.

Massive MIMO Rate Approximations and its Applications

Previously, the achievable user rate for $UE_k$ when scheduled within the user subset $S_i$ by $AP_i$ was derived as follows:

$$R_{k,i}(S_i, t) = \log_2 \left( 1 + \frac{g_{ik} \lambda_{k,S_i}(t) \frac{P_i}{|S_i|}}{1 + \sum_{j \in J} g_{jk} P_j} \right)$$

In the Massive MIMO regime where $M \times \times |S_i|$, SINR for each user becomes independent of the small scale fading coefficients and can be written as follows, still assuming equal power allocation for each user in the set $S_i$:

$$SINR_{i,k} \rightarrow \frac{g_{ik}(M - |S_i| + 1)P_i / |S_i|}{1 + \sum_{j \neq i} g_{jk} P_j}$$

Then the rate of $UE_k$ if it is served in group $S_i$ by $AP_i$ is as follows:

$$R_{i,k}(S_i) \rightarrow \log\left( 1 + \frac{g_{ik}(M - |S_i| + 1)P_i / |S_i|}{1 + \sum_{j \neq i} g_{jk} P_j} \right)$$

Notice that in the above formula, user rates do not depend on the small scale fading, hence the same user set served by the same AP gets the same rates for its users at any resource block. In other words, at any resource block, a $UE_k$ in set $S_i$ (served by $AP_i$), gets the rate $R_{i,k}(S_i)$ if the set $S_i$ is served by $AP_i$ at this resource block. Hence, the average user rate across T resource blocks is a weighted average across various feasible scheduling instants employed over T resource blocks. Assume there are W many feasible scheduling sets and with feasible scheduling instant, $\underline{S}^{(w)}=\{S_1^{(w)}, S_2^{(w)}, \ldots, S_J^{(w)}\}$ is used at $\beta_w T$ many resource blocks where $0 \leq \beta_w \leq 1$. Then the average user rate can be re-written as follows:

$$R_k = \sum_{w=1}^{W} \beta_w T \sum_{i \in J} R_{k,i}(S_i^{(w)})$$

Due to this time-sharing, the rate region for all user rates where network utility optimization $$\max \sum_{k} U(R_k)$$

can be done is the convex hull of the vertices, where each vertex corresponds to the rates users get with a feasible scheduling instant. The optimization parameters are the time-sharing coefficients, $\beta_w$'s.

Notice that in the above formula, the effect of the user group $S_i$ only shows through its size. A user gets a different rate depending on which AP is serving as well as the size of the set, but not the specific set or the resource block. With this observation, the achievable user rate can be written as a function of the index of the UE, k; index of the AP, i; serving the UE and as well as the scheduling set size, s and the available transmit power for each AP. We let $\underline{P}=[P_1, P_2, \ldots, P_J]$ denote the power mask, then the UE rate is calculated as follows:

$$R_{i,k,s}(\underline{P}) = \log\left(1 + \frac{g_{ik}(M-s+1)P_i/s}{1 + \sum_{j \neq i} g_{jk} P_j}\right)$$

TDMA across different feasible scheduling instants, result in various users to be served by different APs in different size groups. We let $\alpha_{i,k,s}$ be the fraction of the resources $UE_k$ is served by $AP_i$ in set of size s. In other words, $\alpha_{i,k,s}T$ out of T resource blocks, $UE_k$ is served by $AP_i$ in a set of size s. The average rate for $UE_k$ can be written as follows in terms of activity fractions and set size & AP dependent rate formula. The set size s can be between 1 to $s_{max}$ where $M \gg s_{max}$. Let D be the set of all possible scheduling set sizes.

$$R_k(\underline{P}) = \sum_{i=1}^{J} \sum_{s \in D} \alpha_{i,k,s} R_{i,k,s}(\underline{P})$$

The activity fractions provide sufficient information on how the user load is balanced across many APs in a network. For example, $AP_i$ schedules user sets of size s over $$\frac{T}{s} \sum_{k \in A} \alpha_{i,k,s}$$

resource blocks. As shown, the load distribution for each AP is determined by the activity fractions. By writing average user rates in terms of activity fractions, network utility maximization problems can be reformulated as optimization over activity fractions. The solution of this problem determines the load balance across APs but not necessarily determine the scheduling instants to be used at resource blocks. In fact, there might exist more than one schedule that results in the same activity fractions. Different schedules result in the same user rates; hence, the same network utility can be designed taking into account other aspects such as information dissemination cost, signaling cost, user application constraints, etc.

Load Balancing and Activity Fractions

The above separation of load balancing and user scheduling without performance suffering in terms of network utility optimization is described herein. A generic network utility maximization problem can be written in terms of activity fractions as follows:

$$\max_{\{\alpha_{i,k,s}\}} \sum_{k} U\left(\sum_{i=1}^{J} \sum_{s \in D} \alpha_{i,k,s} R_{i,k,s}(\underline{P})\right) \text{ subject to}$$

$$\sum_{i=1}^{J} \sum_{s \in D} \alpha_{i,k,s} \leq 1, \quad \forall k \in A,$$

$$\sum_{s \in D} \alpha_{i,s} = 1, \quad \forall i \in \{1, 2, \ldots, J\},$$

$$\frac{1}{s} \sum_{k \in A} \alpha_{i,k,s} \leq \alpha_{i,s}, \quad \forall s \in D, i \in \{1, 2, \ldots, J\},$$

$$\alpha_{i,k,s} \leq \alpha_{i,s}, \quad \forall k \in A, s \in D, i \in \{1, 2, \ldots, J\},$$

$$\alpha_{i,k,s} \geq 0, \quad \forall k \in A, s \in D, i \in \{1, 2, \ldots, J\},$$

where $\alpha_{i,s}$ denotes the fraction of time $AP_i$ serves a subset of size s, and $\Lambda_{i,k}$ be the fraction of time $UE_k$ is associated to $AP_i$ for service. The five listed constraints in the above optimization problem are for feasibility guarantee for any activity fraction solution.

Network utility optimization over activity fractions provides the same performance with network utility optimization over time-sharing coefficients across feasible schedule instants. Optimization over activity fractions provides the flexibility of choosing scheduling instants later with respect to other operation aspects, constraints. In most cases of utility functions, it also provides a more simplified optimization.

In one embodiment, the utility function is the sum of the log user rates $$U(R_1, R_2, \ldots, R_K) = \sum_{k} \log(R_k).$$

In another embodiment, the utility function is the weighted sum of the user rates $$U(R_1, R_2, \ldots, R_K) = \sum_{k=1}^{K} w_k R_k.$$

In yet another embodiment, the utility function is the minimum of user rates $U(R_1, R_2, \ldots, R_K) = \min_k R_k$.

In one embodiment, the size of scheduling sets for each AP is constrained to be a subset of $\{1, 2, \ldots, s_{max}\}$. In one embodiment, the set size for each AP is pre-selected, such as, for example, let $AP_i$ serves sets of size $s_i$. Hence, whenever a user is served with an AP, the serving set size is fixed. This allows the dependency on set size in the activity fractions to be dropped and with an abuse of notation, the optimization problem can be simplified as follows:

$$\max_{\{\alpha_{i,k}\}} \sum_k U\left(\sum_{i=1}^J \alpha_{i,k} R_{i,k}(\underline{P})\right) \quad (2)$$

subject to $$0 \leq \alpha_{i,k} \leq 1, \forall k \in A, \forall i \in \{1, 2, \ldots, J\},$$

$$\sum_{k=1}^K \alpha_{i,k} = s_i, \forall i \in \{1, 2, \ldots, J\},$$

$$\sum_{i=1}^J \alpha_{i,k} \leq 1, \forall k \in A,$$

where $\alpha_{i,k}$ denotes the fraction of the time $UE_k$ is served by $AP_i$.

In one embodiment, the wireless communication network is operated by using time-sharing across different power masks. Optimal activity fractions, and hence user rates, are calculated for various power masks. For example, let $\{\alpha^*_{i,k,s}(\underline{P}_e)\}$'s be the optimal activity fractions found for the wireless communication network when the power mask $\underline{P}_e$ is used, and also let $\{R^*_{i,k,s}(\underline{P}_e)\}$'s be the corresponding user rates. In one embodiment, time-sharing values $\{\pi_e\}$'s for E many power masks are optimized according to the following optimization problem:

$$\max_{\{\pi_e\}} \sum_k U\left(\sum_{e=1}^E \pi_e \sum_{s \in D} \sum_{i=1}^J \alpha^*_{i,k,s}(\underline{P}_e) R^*_{i,k,s}(\underline{P}_e)\right), \quad (3)$$

Notice that, for concave utility functions, the network optimization problem is a convex problem.

In one embodiment, the optimal solution for the problems below $$\max_{a_{\{i,k,s\}}} \sum_k U\left(\sum_{i=1}^J \sum_{s \in D} a_{i,k,s} R_{i,k,s}(\underline{P})\right),$$

$$\max_{a_{\{i,k\}}} \sum_k U\left(\sum_{i=1}^J a_{i,k} R_{i,k}(\underline{P})\right), \text{ problem:} \quad (2)$$

$$\max_{\{\pi_e\}} \sum_k U\left(\sum_{e=1}^E \pi_e \sum_{s \in D} \sum_{i=1}^J a^*_{i,k,s}(\underline{P}_e) R^*_{i,k,s}(\underline{P}_e)\right), \quad (3)$$

can be found by readily available convex optimization toolboxes. In one embodiment, specific optimization problem can be solved analytically.

For any general strictly concave network utility function, the optimal average user rates can be achieved by applying a weighted sum optimization iteratively, where at each iteration the weights are updated. At each iteration, the weighted sum rate optimization is solved. When a weighted sum rate is used for utility, the objective function becomes a linear function of time-sharing variables across many feasible scheduling instants. Hence, the optimum is achieved at one of the vertices in the region defined by the time-sharing variables. In other words, the optimum point is achieved by using the same feasible scheduling instant for all of the resource blocks. Then optimization is performed by using a greedy search over all possible scheduling instants. In a Massive MIMO system, the greedy search over user subsets is also much more simplified due to the hardening of user rates.

In one embodiment, the optimal performance obtained by allowing all possible set sizes is used to determine how much performance is lost due to set size constraint. A similar idea can be also used with large number of power masks.

Note that for any user k, the only activity fractions that need to be determined are those that are between the user and APs in the proximity of the user. In one embodiment, a single scheduling set size is used at each AP, which may be AP-dependent, or tier dependent. In one embodiment, some of the $\{\alpha_{i,k,s}\}$'s are preset to zeros such that some users are never served by some of the APs or certain set sizes are not used.

Scheduling and Pilot Assignments Based on Given Activity Fractions Provided by the Central AP Controller In Massive MIMO rate approximations, instantaneous user rates do not depend on the specific scheduling set the user is scheduled in but rather the size of the set. In one embodiment, network utility optimization is performed over activity fractions rather than user rates. The activity fractions for each AP determine the number of resource blocks that the AP should serve a specific user in a specific set size. But by themselves the activity fractions do not necessarily unambiguously describe the schedule for APs.

Activity fractions are disseminated to the APs so that the scheduler in each AP (e.g., scheduler Mod 216 in FIG. 2) makes the schedule for this AP. In one embodiment, the scheduler in different APs communicate with each other in order to create feasible scheduling instants where two APs do not transmit for the same user at the same resource block when creating the schedule for all of the APs. The communication is done via wired and/or wireless connection. In one embodiment, the schedule for all of the APs for many resource blocks is determined off-line before the transmissions as long as large scale fading is the same at the time of load balancing and scheduling and at the time of actual transmission. When using off-line scheduling, in one embodiment, these can be shared with UEs before transmission such that each user knows at which resource block it is served.

In order to demonstrate the relation between activity fractions and scheduling, a small example with J=2, K=4, T=5 is given. Let the scheduling $\underline{S}$ for 5 resource blocks be as follows:

$S_1(1)=\{1,2\}, S_2(1)=\{3\},$ $S_1(2)=\{3,4\}, S_2(2)=\{1\},$ $S_1(3)=\{2,3\}, S_2(3)=\{1,4\},$ $S_1(4)=\{1,4\}, S_2(4)=\{2,3\},$ $S_1(5)=\{1, 2,3\}, S_2(5)=\{4\},$

According to schedule $\underline{S}$, at the first resource block, $AP_1$ serves 1st and 2nd users, while the second AP serves the 3rd user. Then UEs 1, 2, and 3 need to send their pilot for reciprocity based CSI acquisition for the first resource block. Similarly, at the second resource block, the first AP serves the 3rd and 4th users, while the second AP serves only the first user. Then UEs 1, 3, and 4 need to send their pilot for the second resource block.

This scheduling complies with the following activity fractions:

$\alpha_{1,1,1}=0, \alpha_{1,1,2}=1/5, \alpha_{1,1,3}=1/5, \alpha_{2,1,1}=1/5, \alpha_{2,1,2}=1/5, \alpha_{2,1,3}=0,$ $\alpha_{1,2,1}=0, \alpha_{1,2,2}=2/5, \alpha_{1,2,3}=1/5, \alpha_{2,2,1}=1/5, \alpha_{2,2,2}=1/5, \alpha_{2,2,3}=0,$ $\alpha_{1,3,1}=0, \alpha_{1,3,2}=2/5, \alpha_{1,3,3}=1/5, \alpha_{2,3,1}=1/5, \alpha_{2,3,2}=1/5, \alpha_{2,3,3}=0,$ $\alpha_{1,4,1}=0, \alpha_{1,4,2}=2/5, \alpha_{1,4,3}=0, \alpha_{2,4,1}=1/5, \alpha_{2,4,2}=1/5, \alpha_{2,4,3}=0,$ For a given set of activity fractions, different schedules can be created. For example, the schedule $\tilde{S}$ below also complies with the same activity fractions.

$\tilde{S}_1(1)=\{1,2\}, \tilde{S}_2(1)=\{3\},$ $\tilde{S}_1(2)=\{1,2\}, \tilde{S}_2(2)=\{3,4\},$ $\tilde{S}_1(3)=\{3,4\}, \tilde{S}_2(3)=\{1,2\},$ $\tilde{S}_1(4)=\{1,2,3\}, \tilde{S}_2(4)=\{4\},$ $\tilde{S}_1(5)=\{3,4\}, \tilde{S}_2(5)=\{1\},$ Although both schedules give the same activity fractions, and hence the utility, one might be more preferable than the other. For example, in the second schedule, for every user the resource blocks where it needs to send uplink pilots are contagious: $UE_1$ should send uplink pilots at the resource blocks t=1, ..., 5; $UE_2$ should send uplink pilots at resource blocks t=1, ..., 4; $UE_3$ should send uplink pilots at resource blocks t=1, ..., 5; and $UE_4$ should send uplink pilots at resource blocks t=2, ..., 5. This property can be preferable for higher quality and efficient CSI acquisition.

For a cellular network with large number of APs and UEs, it may not be trivial to come up with schedule designs that are compatible with some given activity fractions. Besides as already shown by the example above, some of the schedule designs might be more preferable in terms of designing a pilot mapping and disseminating this information to the network.

This problem of finding a schedule for all of the APs in the network for some given activity fractions can be divided into two tasks: the first of the two tasks is to devise a method that can come up with a schedule for an AP only considering the activity fractions regarding that AP, and the second task is to devise methods or algorithms to avoid or overcome contention and overlaps between individual schedules of different APs.

Although more complex there is always the option of one shot scheduling design for all APs without dividing the problem into these tasks. For example, time sharing across some feasible scheduling instants can be used to achieve desired activity fractions.

In the following, a couple of methods on obtaining a schedule for a single AP are first explained. Then in the next section, methods on preventing or overcoming overlaps are discussed.

Sample Scheduling Functions and Assignments at an AP

Figure 5:
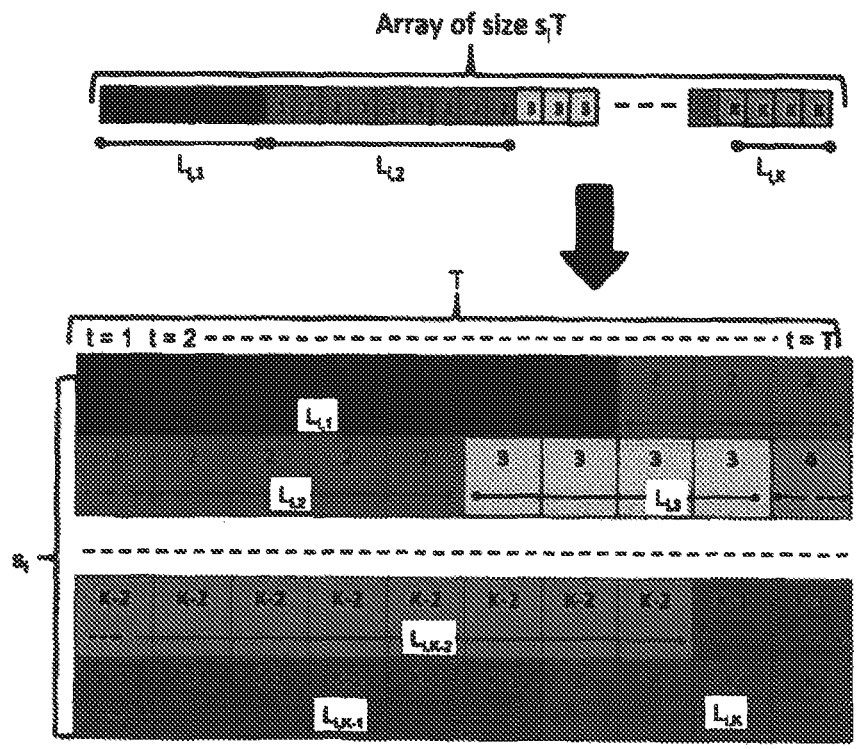
FIG. 5 illustrates one embodiment of a schedule design made with respect to activity lengths.

In one embodiment, an AP can always schedule user sets of the same size. Assume that this is the case for $AP_i$ and $UE_k$ is served by $AP_i$, for $L_{i,k}=\alpha_{i,k}T$ many resource blocks in a set of size $s_i$. Considering $s_i$ many users to be scheduled at each resource block, the scheduling problem for a single AP can be represented by filling the columns of a $s_i \times T$ matrix with numbers from 1 to K where numbers at column t represent the scheduling set at resource block t. In order to satisfy feasible scheduling the numbers in a column cannot repeat. Also the total occurrence of number k should be equal to $L_{i,k}=\alpha_{i,k}T$. Below one embodiment of an algorithm on how to get such matrix and hence the scheduling for $AP_i$ is described:

1—Calculate $L_{i,k}=\alpha_{i,k}T$.
2—Construct an array with $s_iT$ elements as follows:
  a. Initialization: Create an empty array.
  b. For every k=1: K, append $L_{i,k}$ many k's to the array.
3—Next a $s_i \times T$ matrix is constructed from the array of size $s_iT$, and the array is divided into $s_i$ sub arrays of size T such that the $r^{th}$ sub array is actually the elements from (r−1)T+1 to rTelements of the array. An example is shown in FIG. 5.

For the DL transmission to be successful in a resource block, users selected for the transmission send their uplink pilots at specific frequency and time resources according to a pilot design within the same resource block. A DL transmission with $s_i$ users requires at least $s_i$ many UL resource elements (or resource dimensions) for channel sounding. A predetermined set of such UL resource elements can be used, over which the UEs can transmit orthogonal pilot-codeword signals according to a predetermined UL pilot-code design. This code design might be independent of the scheduling set but might depend on the size of the scheduling set. Hence the code design is described by using generic user IDs from 1 to $s_i$ representing the 1st scheduled user, 2nd scheduled user and etc. In one embodiment, in order to avoid pilot contamination, the scheduled users are ordered and labeled from 1 to $s_i$ for each resource block. A UE knows when to send UL pilots and receive DL data by knowing the resource block in which it is scheduled and as well as the label given to itself. Notice that these labels are resource block dependent.

Next, the following discusses how it is possible to use the same $s_i \times T$ matrix for ordering and labeling the scheduled users. A single column represents users scheduled for one resource block where at each row entry there is a single user. This already provides the ordering necessary for scheduled users: for any resource block, the UE at the r-th row can be labeled as the r-th user.

Note that activity fractions unambiguously describe this matrix and thus it is enough to distribute $L_{i,k}$'s the activity fractions to UEs. Using the matrix, a UE constructs the scheduling matrix, locate locations at which its labels appear. The column represents the resource block and the row represents the label. The knowledge of $L_{i,k}$ for every k and i at every AP can require a lot of signaling. In one embodiment, this information is shared after some quantization and compression. Also note that a UE can determine its corresponding locations in the matrix only by knowing the starting and ending positions of its number in the array. In one embodiment, the start and the end positions of a UE in the array are disseminated to the UE.

Figure 6:
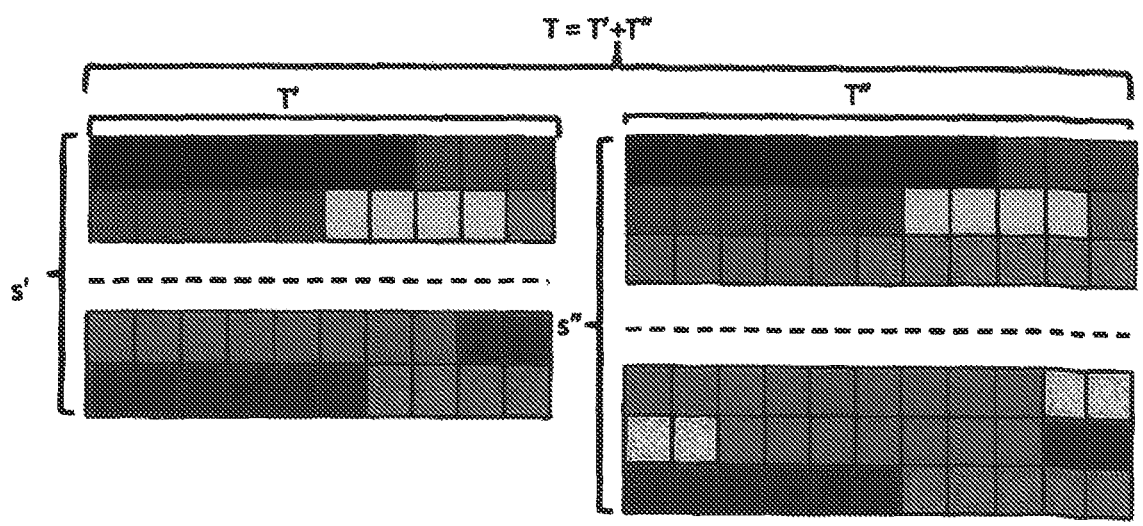
FIG. 6 illustrates of another embodiment of a schedule design with respect to activity lengths with different set sizes.

An extension of this algorithm can also work when an AP schedules different size sets. As shown in FIG. 6, the resource blocks are ordered according to the set sizes. Resource blocks with the same set size make a matrix where the above scheduling algorithm can be applied. Then the resultant scheduling matrices are appended to each other as shown in the FIG. 6 makes the overall scheduling.

Avoiding Scheduling Contentions between APs

In embodiments provided herein, the central controller may assign to a given UE nonzero activity fractions to more than one AP. Such a user can be viewed as a "common" user among these APs. The controller may provide information, which may enable the APs to serve such a common user over different transmission resource elements thereby avoiding scheduling contention.

In one embodiment, the APs update their schedules with respect to each other's schedules by shuffling users in their schedule such that overall activity fractions are not significantly changed or new contentions are not created. But this method requires collaboration and communication between APs to update their schedule.

Instead of trying to overcome contention by shuffles, next a contention avoidance method by assignment of resources to specific users by each AP is described.

The main idea depends on the fact that two APs sharing common users should serve their common users at different resources. If this is satisfied for all AP pairs, there will not be any contention. Hence APs should group the users they serve and assign specific frequency and time resource regions to these groups such that the regions belonging to different APs are disjoint if their corresponding groups have common users.

Figure 7:
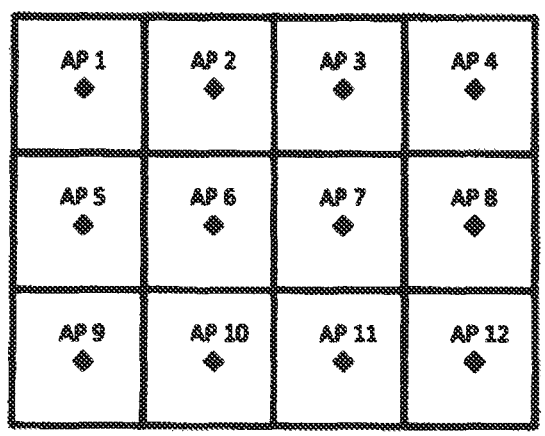
FIG. 7 illustrates a wireless network topology of APs on a square grid.

An example with a simple network topology is shown in FIG. 7.

In this example, assume a network topology where APs are on a square grid and users are distributed across the whole region. Next assume that for some utility optimization, the activity fractions are such that an UE is either always served only by the same AP or served by at least two APs from among the four closest APs.

Looking from perspective of AP-6, the users with non-zero activity fractions with AP-6 are grouped as follows: some of the users it serves are not served by any other AP, and these users are named as Group 0 for AP-6; some of the other uses are served by AP-1, AP-2 and AP-5 besides AP-6, and this group is named as number 1; some of the other uses are served by AP-2, AP-3, and AP-7 besides AP-6, and this group is named as number 2; some of the other uses are served by AP-5, AP-9 and AP-10 besides AP-6, and this group is named as number 3; and some of the other uses are served by AP-7, AP-10, and AP-11 besides AP-6, and this group is named as number 4.

Similar groups with the same labeling method can be done for other APs in the network. As an example, it is shown that Group 4 for AP-6 has common users with the Group 1 of AP-11. (See FIG. 8 left hand side) AP-6 and AP-11 should not schedule these users at the same resource region; otherwise, there is a contention problem between AP-6 and AP-11.

Figure 8:
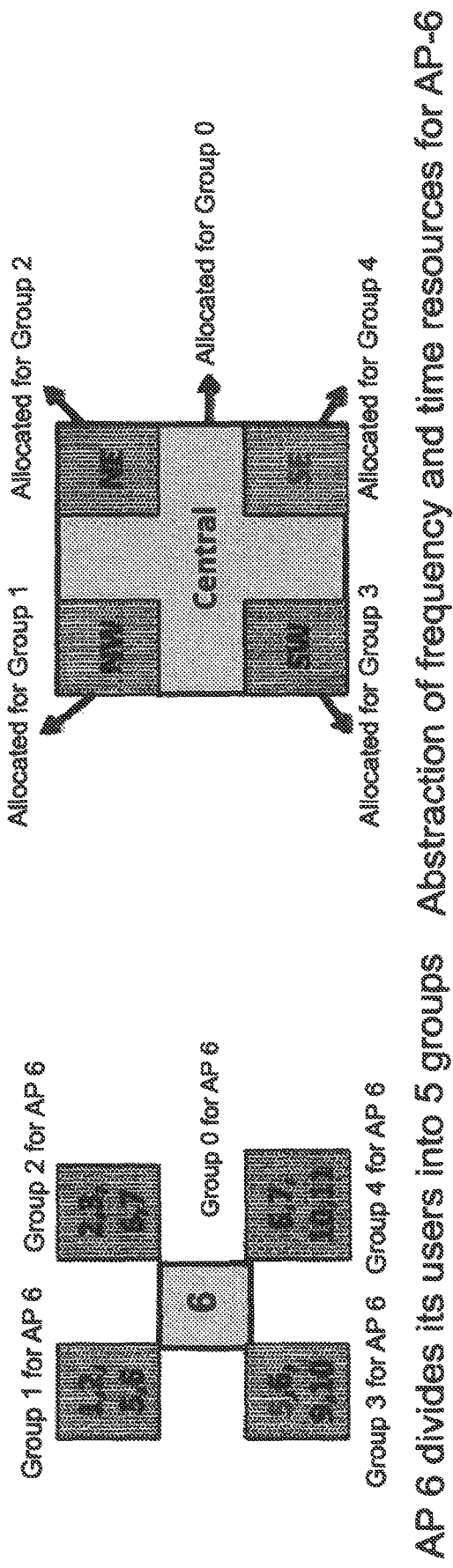
FIG. 8A illustrates an example of an AP dividing its user terminals into groups.
FIG. 8B illustrates an abstraction of frequency and time resources for the AP of FIG. 8A.

Next consider an abstraction of frequency and time resources for AP-6 where the resources are mapped in a way to be represented by a square as shown in FIG. 8 (right hand side). AP-6 divides its resources into 5 regions, namely Central, NW, NE, SW, SE. Each region is assigned to one of the five user groups. As an example, it can be seen from FIG. 8, right hand side, that AP-6 serves users in its 1st group at NW resource region.

The same resource mapping, division and assignment is applied to other APs.

To avoid the contention problem between AP-6 and AP-11 due to common users between 4th group of AP-6 and 1st group of AP-11, notice that AP-6 serves users in its 4th group at SE resource region, while AP-11 serves users in its 1st group in NW resource region. Hence, overlap is successfully avoided and APs are free to schedule independently these common users without any possible overlaps. It can actually be seen that by symmetry all possible overlaps between any two AP are avoided by the resource division shown in the example.

Embodiments of the invention have one or more of the following advantages with respect to the previous scheduling and load balancing approaches:

1) Embodiments of the invention partition load balancing and the scheduling between a central controller and the involved APs without compromising performance. In particular, based on relevant information provided by the APs, the central controller performs "coarse-scale" load balancing by determining the fraction of resources to be allocated at each AP to serve particular users. The individual scheduling assignments to comply with coarse resource allocation is left to the APs to perform.

2) Embodiments of the invention simplify load balancing by allowing flexibility in the scheduling operation at each AP without compromising load-balancing performance. Hence, additional user-based/application criteria can be readily and flexibly addressed at each AP.

3) Load-balancing methods set forth herein determine resource allocation at a coarser time scale. Furthermore, in contrast to previous multi-user scheduling algorithms, embodiments of the invention only use large-scale characteristics for load balancing and scheduling. This allows for off-line computation and dissemination with respect to load balancing and scheduling determinations.

4) There is flexibility left to each AP for scheduling MU-MIMO transmission. In that a scheduling assignment by an AP for which each user is served with a pre-indicated fraction of resources for MU-MIMO transmission (and, possibly, of a certain size demanded by the central controller) would achieve the required load-balancing performance. As a result, the precise instantaneous scheduling assignments at each AP can be performed with respect to overhead or other criteria, without changing the resultant utility.

5) Unlike previous multi-user scheduling algorithms, which have very high complexity (as they require on-line computations), even scheduling at each AP can be performed over a larger time scale due to properties of Massive MIMO.

6) Methods described herein can also be used to enable load balancing across small cells with Massive MIMO deployments.

7) Methods described herein can also be used to enable more general cellular schemes in which a user is not served by a single BS all the time but can be fractionally served by multiple BSs (in a massive MIMO transmission).

8) Methods described herein enable a form of "network-wide association" TDD based MU-MIMO. Users do not need to know which BS or antenna is serving them. Users need to know only which resource block they are being served and at which resource elements they should transmit their uplink pilots.

Since user rates depend only on the large scale fading which does not change rapidly, the load balancing and user scheduling in embodiments of the invention can be done considering a large number of resource blocks. This makes it possible to provide the schedule instances to the users so that they can know at which resource element, they need to send an uplink pilot and be served over a large subset of resource-block resources. This can enable large savings in control signaling overheads. Some problems addressed by one or more embodiments of the invention include the following:

1) load balancing and scheduling techniques for Massive MIMO cellular deployments;

2) network optimization for TDD/reciprocity based MU-MIMO;
3) resource and overhead-efficient scheduling designs subject to load balancing constraints; and
4) low-overhead pilot designs for Massive MIMO small cells.

An Example of a Central AP Controller

Figure 9:
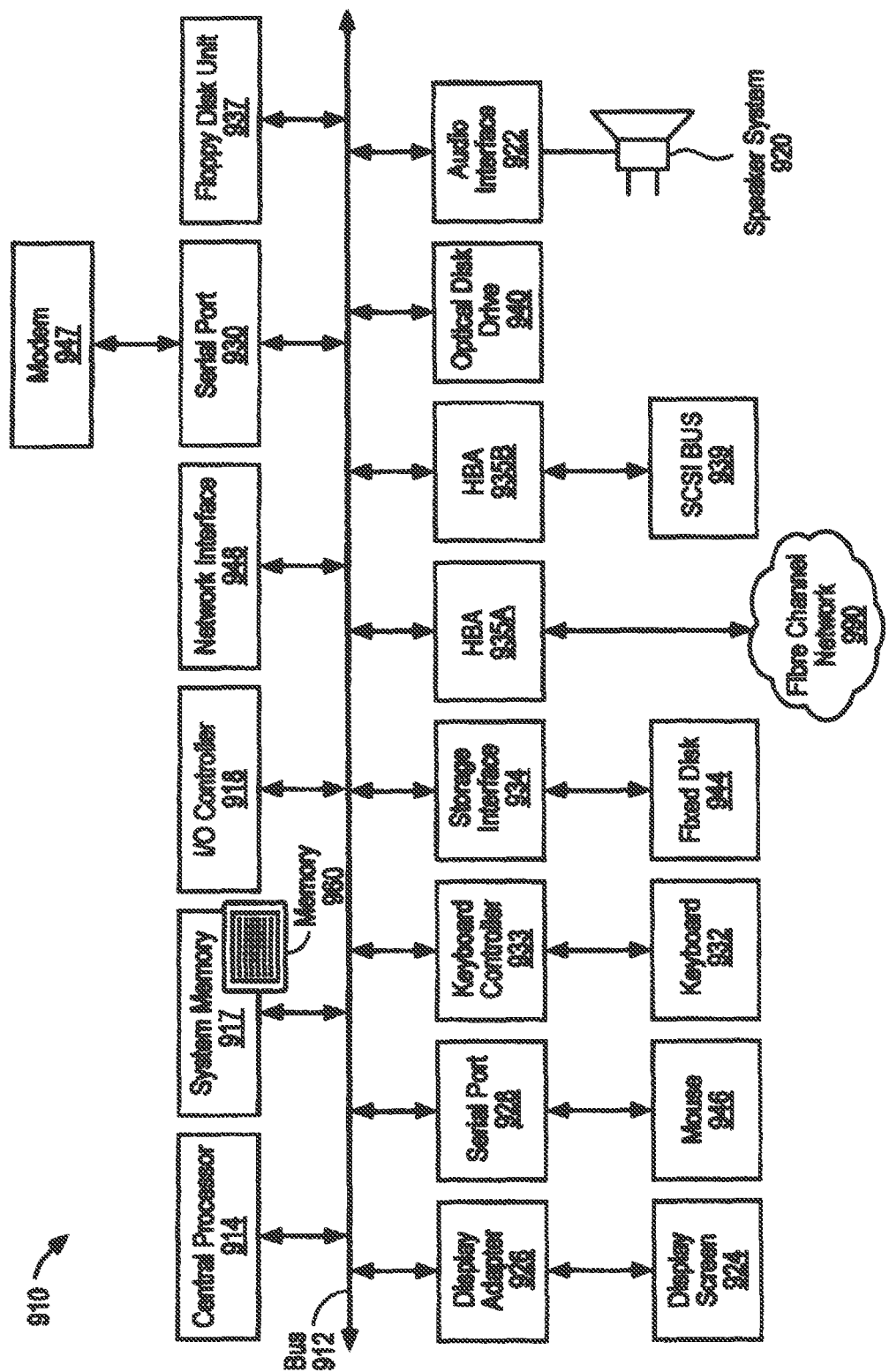
FIG. 9 is a block diagram of one embodiment of a central controller.

FIG. 9 depicts a block diagram of a central AP controller, such as central AP controller 100 of FIG. 1. Referring to FIG. 9, central AP controller 910 includes a bus 912 to interconnect subsystems of central AP controller 910, such as a processor 914, a system memory 917 (e.g., RAM, ROM, etc.), an input/output controller 918, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917. System memory 917 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems.

Modem 947 may provide a direct connection to a remote server via a telephone link or to the Internet via an intern& service provider (ISP). Network interface 948 may provide a direct connection to an AP such as, for example, APs of FIG. 1. Network interface 948 includes at least one transmitter and at least one receiver. Network interface 948 may provide a direct connection to an AP (e.g., APs of FIG. 1) via a direct network link to the Internet via a POP (point of presence). Network interface 948 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 9 need not be present to practice the techniques described herein. The devices and subsystems can be interconnected in different ways from that shown in FIG. 9. The operation of a computer system such as that shown in FIG. 9 is readily known in the art and is not discussed in detail in this application.

Code to implement the central AP controller operations described herein can be stored in computer-readable storage media such as one or more of system memory 917 (e.g., memory 960), fixed disk 944, optical disk 942, or floppy disk 938. The operating system provided on computer system 910 may be MS-DOS®, MS-WINDOWS®, OS/2®, UNIX®, Linux®, or another known operating system.

Figure 10:
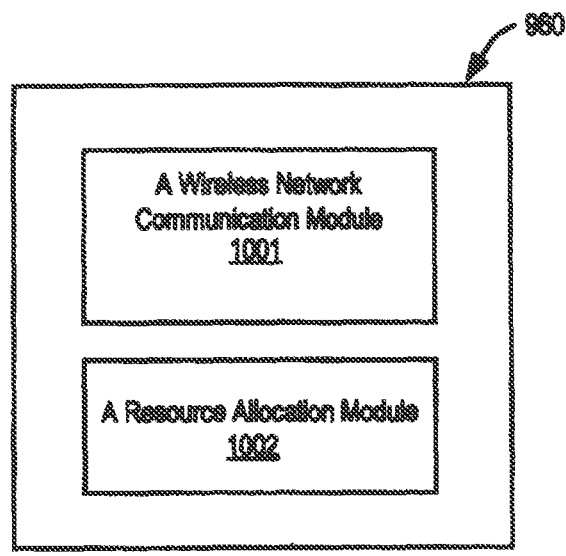
FIG. 10 illustrates a set of code (e.g., programs) and data that is stored in memory of one embodiment of a central controller.

FIG. 10 illustrates a set of code (e.g., programs) and data that is stored in memory of one embodiment of a central AP controller, such as memory 960 of the central controller in FIG. 9. The central AP controller uses the code, in conjunction with a processor, to implement the necessary operations (e.g., logic operations) to implement the described herein.

Referring to FIG. 10, memory 960 includes a wireless network communication module 1001 used for performing communication with the access points (APs). This includes both receiving and transmitting information. For example, communication module 1001 receives, from at least one AP, for at least one user terminal, a size of a user set and user rate information indicative of a rate that can be provided to the user terminal when served in a group of one or more user terminals. Furthermore, communication module 1001 sends to each AP information indicative of the allocation of AP resources among user terminals for that AP. The information indicative of the allocation of AP resources comprises one or more activity fractions specifying fractions of resources each user terminal is served by an AP in the user set size for each AP-user terminal pair when scheduling user terminals in a user set and for at least one power mask. The memory also stores a resource allocation module 1002, which when executed by the processor, determines, based on user rate information and the user set size, an allocation of AP resources among the user terminals for each AP.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for operating a wireless network comprising at least one access point (AP) and at least one user terminal via a central controller allocating resources for scheduling wireless transmission, the method comprising:

performing load balancing over an area served by a plurality of APs based on a network-wide criterion using individual long-term user rates provided by the wireless network and received by users in one or more sets of users, the network-wide criterion being independent of the one or more sets of users, wherein performing load balancing includes receiving, by the central controller from at least one AP, for at least one user terminal, a size of a user set and user rate information indicative of a rate that can be provided to the user terminal from one AP of the at least one AP when served in a group of user terminals by the one AP of the at least one AP;

determining, by the central controller, based on user rate information and the user set size, an allocation of AP resources among the user terminals for the at least one AP;

sending to each AP information indicative of the allocation of AP resources for each user terminal in the user set size for said each AP; and then performing user scheduling at said each AP, separately from the load balancing, based on information provided by the central controller to said each AP indicative of the allocation of resources, wherein user scheduling is performed independently at each AP based on the resource allocation determined by the central controller.

2. The method defined in claim 1 further comprising: disseminating information to the user terminals regarding scheduling transmission and pilot transmission.

3. The method defined in claim 1 wherein the information indicative of the allocation of AP resources comprises one or more activity fractions specifying fractions of resources each user terminal is served by an AP in the user set size for said at least one AP-user terminal pair when scheduling user terminals in a user set and for at least one power mask.

4. The method defined in claim 3 wherein the activity fractions are for said at least one AP-user terminal when scheduling user terminals for at least one power mask.

5. The method defined in claim 1 further comprising applying, by the central controller, a network-wide utility metric, including combining, into a single metric, locally averaged rates provided by the network based on resources allocated to the user terminals.

6. The method defined in claim 5 wherein the network-wide utility metric is based on an $\alpha$-fairness criterion.

7. The method defined in claim 1 wherein the user rate information is dependent on the large-scale propagation characteristics of wireless channels between user terminals and APs.

8. The method defined in claim 1 wherein performing user scheduling at said each AP based on information provided by the central controller to said each AP indicative of the allocation of resources is for said at least one AP-user terminal pair and based on one or both of user and application constraints.

9. The method defined in claim 1 further comprising assigning, by an AP, a subset of pilot resource elements, to a set of user terminals, wherein assigning the subset of pilot resource elements comprises: ordering the pilot resource elements into a first order; ordering user terminals in the set of terminals into a second order; determining a number of pilot resources a user terminal in the set of user terminals is assigned from the subset of pilot resources based on the resource allocation determined by the central controller; and assigning pilot resources to the user terminals in the second order, according to the first order of the pilot resource elements and according to number of pilot resources assigned to client.

10. The method defined in claim 9 wherein the first order of pilot resource elements is chosen so that no more than a predetermined number of consecutive pilot elements in the first order are within the same resource block.

11. The method defined in claim 2 wherein the information sent by the central controller to a first AP regarding a user terminal for which the central controller specified a resource allocation includes information indicative of allocation of resources between the user terminal and a second AP different from the first AP.

12. A controller for use in a wireless network comprising at least one access point (AP) and at least user terminal, the controller to perform load balancing over an area served by a plurality of APs based on a network-wide criterion using individual long-term user rates provided by the wireless network and received by users in one or more sets of users, the network-wide criterion being independent of the one or more sets of users, wherein the controller is operable to perform load balancing using:

a receiver to receive, from at least one AP, for at least one user terminal, a size of a user set and user rate information indicative of a rate that can be provided to the user terminal from one AP of the at least one AP when served in a group of user terminals by the one AP of the at least one AP; and a resource allocation unit to determine, based on user rate information and the user set size, an allocation of AP resources among the user terminals for the at least one AP; and a transmitter to send to each AP information indicative of the allocation of AP resources for each user terminal in the user set for said each AP to enable said each AP to then perform user scheduling at based on information provided by the central controller to said each AP indicative of the allocation of resources, wherein user scheduling is performed at each AP independently of the controller performing the load balancing.

13. The controller defined in claim 12 wherein the information indicative of the allocation of AP resources comprises one or more activity fractions specifying fractions of resources each user terminal is served by an AP in the user set size for said at least one AP-user terminal pair when scheduling user terminals in a user set.

14. The controller defined in claim 12 wherein the resource allocation unit applies a network-wide utility metric to locally averaged rates provided by the network based on resources allocated to the user terminals.

15. The controller defined in claim 14 wherein the network-wide utility metric is based on an a-fairness criterion.

16. The controller defined in claim 12 wherein the user rate information is dependent on the large-scale propagation characteristics of wireless channels between user terminals and APs.

17. A wireless network comprising:
a plurality of access points (APs);
a plurality of user terminals; and
a controller to perform load balancing over an area served by a plurality of APs based on a network-wide criterion using individual long-term user rates provided by the wireless network and received by users in one or more sets of users, the network-wide criterion being independent of the one or more sets of users, wherein the controller is operable to perform load balancing using:
a receiver to receive, from at least one of the plurality of APs, for at least one user terminal, a size of a user set and user rate information indicative of a rate that can be provided to the user terminal from one AP of the at least one AP when served in a group of user terminals by the one AP of the at least one AP,
a resource allocation unit to determine, based on user rate information and the user set size, an allocation of AP resources among the user terminals for the at least one AP, and
a transmitter to send to each of the plurality of APs information indicative of the allocation of AP resources for each user terminals in the user set size for said each AP,
wherein, in response to receiving the information indicative of the allocation of AP resources among user terminals, each of the plurality of APs is operable to perform user scheduling based on information provided by the central controller to said each AP indicative of the allocation of resources, wherein user scheduling is performed at each AP independently of other APs in the plurality of APs and the controller performing the load balancing.

18. The wireless network defined in claim 17 wherein the information indicative of the allocation of AP resources comprises one or more activity fractions specifying fractions of resources each user terminal is served by an AP in the user set size for said at least one AP-user terminal pair when scheduling user terminals in a user set.

19. The wireless network defined in claim 17 wherein the resource allocation unit applies a network-wide utility metric to locally averaged rates provided by the network based on resources allocated to the user terminals.

20. The wireless network defined in claim 19 wherein the network-wide utility metric is based on an α-fairness criterion.

21. The wireless network defined in claim 17 wherein the user rate information is dependent on the large-scale propagation characteristics of wireless channels between user terminals and APs.

22. The wireless network defined in claim 17 wherein the at least one AP is to perform user scheduling based on information provided by the central controller to said at least one AP indicative of the allocation of resources for AP-user terminal pairs and based on one or both of user and application constraints.

23. The wireless network defined in claim 17 wherein the at least one AP is to assign a subset of pilot resource elements, to a set of user terminals, by: ordering the pilot resource elements into a first order; ordering user terminals in the set of terminals into a second order; determining a number of pilot resources a user terminal in the set of user terminals is assigned from the subset of pilot resources based on the resource allocation determined by the central controller; and assigning pilot resources to the user terminals in the second order, according to the first order of the pilot resource elements and according to number of pilot resources assigned to client.

24. The wireless network defined in claim 23 wherein the first order of pilot resource elements is chosen so that no more than a predetermined number of consecutive pilot elements in the first order are within the same resource block.

25. An article of manufacture having one or more non-transitory computer readable storage media storing executable instructions thereon which when executed cause a controller to perform a method for use in a wireless network comprising at least one access point (AP) and at least user terminal, the method comprising:

perform load balancing over an area served by a plurality of APs based on a network-wide criterion using individual long-term user rates provided by the wireless network and received by users in one or more sets of users, the network-wide criterion being independent of the one or more sets of users, wherein the controller is operable to perform load balancing by receive, from at least one AP, for at least one user terminal, a size of a user set and user rate information indicative of a rate that can be provided to the user terminal from one AP of the at least one AP when served in a group of user terminals by the one AP of the at least one AP;

determine, based on user rate information and the user set size, an allocation of AP resources among the user terminals for the at least one AP;

send to each AP information indicative of the allocation of AP resources for each user terminal in the user set size for said each AP; and then performing user scheduling at said each AP based on information provided by the central controller to said each AP indicative of the allocation of resources, wherein user scheduling is performed at each AP, independently the controller performing the load balancing, based on the resource allocation determined by the central controller.

26. The article of manufacture defined in claim 25 wherein the information indicative of the allocation of AP resources comprises one or more activity fractions specifying fractions of resources each user terminal is served by an AP in the user set size for said at least one AP-user terminal pair when scheduling user terminals in a user set and for at least one power mask.

27. The article of manufacture defined in claim 24 wherein the resource allocation unit applies a network-wide utility metric to locally averaged rates provided by the network based on resources allocated to the user terminals, wherein the network-wide utility metric is based on an α-fairness criterion.

28. The article of manufacture defined in claim 25 wherein the user rate information is dependent on the large-scale propagation characteristics of wireless channels between user terminals and APs.

* * * * *